United States Patent
Takahara et al.

(10) Patent No.: US 7,978,236 B2
(45) Date of Patent: Jul. 12, 2011

(54) IMAGE-CAPTURING DEVICE THAT DISPLAYS A SHIFTED ENLARGEMENT AREA

(75) Inventors: Hiroaki Takahara, Matsudo (JP); Naoki Jimbo, Bunkyo-ku (JP)

(73) Assignee: Nikon Corporation, Tokyo (JP)

( * ) Notice: Subject to any disclaimer, the term of this patent is extended or adjusted under 35 U.S.C. 154(b) by 595 days.

(21) Appl. No.: 12/071,884

(22) Filed: Feb. 27, 2008

(65) Prior Publication Data

US 2008/0204587 A1   Aug. 28, 2008

(30) Foreign Application Priority Data

Feb. 27, 2007  (JP) ................. 2007-047528
Jun. 4, 2007   (JP) ................. 2007-148121
Jul. 12, 2007  (JP) ................. 2007-182963

(51) Int. Cl.
   *H04N 5/262* (2006.01)
(52) U.S. Cl. ................. 348/240.99
(58) Field of Classification Search ............. 348/240.99, 348/152, 161, 240.1, 240.2, 240.3, 333.01, 348/333.02, 333.11; 382/115, 118
   See application file for complete search history.

(56) References Cited

U.S. PATENT DOCUMENTS

| | | | |
|---|---|---|---|
| 6,711,297 B1 * | 3/2004 | Chang et al. ................. | 382/240 |
| 7,492,406 B2 * | 2/2009 | Park et al. ................. | 348/333.05 |
| 2003/0071904 A1 | 4/2003 | Karasaki et al. | |
| 2004/0145670 A1 * | 7/2004 | Hong ....................... | 348/333.01 |
| 2004/0239686 A1 * | 12/2004 | Koyama et al. ............... | 345/620 |
| 2005/0128333 A1 * | 6/2005 | Park et al. ................. | 348/333.12 |
| 2005/0179780 A1 * | 8/2005 | Kikkawa et al. ........... | 348/207.99 |
| 2005/0270399 A1 * | 12/2005 | Kawaguchi et al. ...... | 348/333.11 |
| 2007/0285534 A1 * | 12/2007 | Makioka ................... | 348/240.99 |

FOREIGN PATENT DOCUMENTS

| | | |
|---|---|---|
| JP | A-11-196301 | 7/1999 |
| JP | A-2001-211417 | 8/2001 |
| JP | A-2003-125251 | 4/2003 |
| JP | A-2003-207713 | 7/2003 |
| JP | A-2004-282648 | 10/2004 |

OTHER PUBLICATIONS

European Search Report issued in Application No. 08150200.3; Mailed on Dec. 28, 2009.

* cited by examiner

*Primary Examiner* — Nicholas G Giles
(74) *Attorney, Agent, or Firm* — Oliff & Berridge, PLC

(57) ABSTRACT

An image-capturing device includes: an image-capturing unit that captures a subject image formed via a photographic optical system; a display unit that displays a through image of the subject image captured by the image-capturing unit; an enlargement area setting unit that sets a position of an enlargement area in the through image of the subject image to be displayed in an enlargement at the display unit; and a display control unit that enlarges the subject image corresponding to the enlargement area set by the enlargement area setting unit and brings up the enlarged subject image on display at the display unit, and in response to a change instruction for changing the position of the enlargement area issued by the enlargement area setting unit while the enlarged subject image is on display, the display control unit shifts the enlargement area by sustaining a state of enlarged display of the subject image and displays the subject image corresponding to the shifted enlargement area at the display unit.

11 Claims, 10 Drawing Sheets

IMAGE-CAPTURING DEVICE THAT DISPLAYS A SHIFTED ENLARGEMENT AREA

INCORPORATION BY REFERENCE

The disclosures of the following priority applications are herein incorporated by reference
Japanese Patent Application No. 2007-047528 filed Feb. 27, 2007
Japanese Patent Application No. 2007-148121 filed Jun. 4, 2007
Japanese Patent Application No. 2007-182963 filed Jul. 12, 2007

BACKGROUND OF THE INVENTION

1. Field of the Invention

The present invention relates to an image-capturing device.

2. Description of Related Art

There is an image-capturing device known in the related art that displays a focus frame used for focus verification over a subject image on a monitor and also displays an enlargement of the image within the focus frame as necessary so as to enable verification of the focusing state or the state of image blurring in an image recording mode (see Japanese Laid Open Patent Publication No. H11-19.6301).

There is also an image-capturing device known in the related art that reads out a central portion of the image by slicing out the image portion via an image sensor equipped with a greater number of pixels than the number of pixels required for through image display at a monitor or for dynamic image recording and provides a display of an enlargement (digital zoom) of the image portion thus read out without lowering the resolution (see Japanese Laid Open Patent Publication No. 2004-2 82648).

SUMMARY OF THE INVENTION

There is an issue yet to be addressed in the first image-capturing device in the related art described above in that the image within the focus area is simply displayed in an enlargement and thus, the image portion centered on the focus area cannot be enlarged in multiple stages or the focus area in the enlarged state cannot be shifted in order to check the focusing state or the state of image blurring in the vicinity of the focus area.

The second image-capturing device in the related art described above brings up on display an enlargement of the central image portion simply by slicing out and reading the central image portion in the captured image. No technology related to shifting the enlarged display area is disclosed in relation to the image-capturing device, and thus, the image area at an arbitrary position within the photographic image plane cannot be displayed in an enlargement.

According to the 1st aspect of the present invention, an image-capturing device comprises: an image-capturing unit that captures a subject image formed via a photographic optical system; a display unit that displays a through image of the subject image captured by the image-capturing unit; an enlargement area setting unit that sets a position of an enlargement area in the through image of the subject image to be displayed in an enlargement at the display unit; and a display control unit that enlarges the subject image corresponding to the enlargement area set by the enlargement area setting unit and brings up the enlarged subject image on display at the display unit, and in response to a change instruction for changing the position of the enlargement area issued by the enlargement area setting unit while the enlarged subject image is on display, the display control unit shifts the enlargement area by sustaining a state of enlarged display of the subject image and displays the subject image corresponding to the shifted enlargement area at the display unit.

According to the 2nd aspect of the present invention, in the image-capturing device according to the 1st aspect, it is preferred that if a subject image absent portion in which the subject image is not present appears in a display screen of the display unit when the subject image corresponding to the enlargement area is enlarged and displayed at the display screen, the display control unit displays the subject image absent portion on the display unit in a display mode that enables a photographer to recognize an appearance of the subject image absent portion.

According to the 3rd aspect of the present invention, in the image-capturing device according to the 1st or the 2nd aspect, it is preferred that: the image-capturing device further comprises a detection area setting unit that sets a detection area from which a specific type of subject information is detected from a photographic field; and the enlargement area setting unit sets an area containing the detection area as the enlargement area.

According to the 4th aspect of the present invention, in the image-capturing device according to the 3rd aspect, it is preferred that the display control unit displays the subject image in an enlargement at the display unit by ensuring that the detection area is positioned at a center of a display screen of the display unit.

According to the 5th aspect of the present invention, in the image-capturing device according to the 1st aspect, it is preferred that: the image-capturing device further comprises a decision-making unit that makes a decision as to whether or not an absent portion in which the subject image is not present will appear in a display screen of the display unit if the subject image corresponding to the enlargement area having been set is displayed in an enlargement at the display screen of the display unit; and if the decision-making unit determines that the absent portion will appear, the enlargement area setting unit alters the enlargement area so as to ensure that the absent portion will not appear in the display screen.

According to the 6th aspect of the present invention, in the image-capturing device according to the 5th aspect, it is preferred that: the image-capturing device further comprises a detection area setting unit that sets a detection area from which a specific type of subject information is detected from a photographic field; and the enlargement area setting unit sets an area containing the detection area as the enlargement area.

According to the 7th aspect of the present invention, in the image-capturing device according to the 5th or the 6th aspect, it is preferred that in a display mode in which the display control unit allows the detection area to be displayed at any position within the display screen at the display unit, the enlargement area setting unit alters the enlargement area.

According to the 8th aspect of the present invention, in the image-capturing device according to the 7th aspect, it is preferred that: in response to a change instruction for changing the position of the enlargement area issued via the enlargement area setting unit while the enlarged subject image is on display, the decision-making unit makes a further decision as to whether or not the absent portion will appear if the position of the enlargement area is altered as indicated in the change instruction; and if the decision-making unit determines that the absent portion will appear, the display control unit adjusts the position of the detection area in the display screen and brings up a display without changing the position of the enlargement area, as indicated in the change instruction.

According to the 9th aspect of the present invention, in the image-capturing device according to any one of the 3rd, 4th, 6th, 7th and 8th aspects, it is preferred that: the detection area setting unit is able to select and set any area among a plurality of detection areas before the enlarged display is brought up at the display unit; and the enlargement area setting unit sets as the enlargement area an area containing the detection area set by the detection area setting unit before the enlarged display is brought up at the display unit.

According to the 10th aspect of the present invention, in the image-capturing device according to any one of the 3rd, 4th and 6th through 9th aspects, it is preferred that: the image-capturing device further comprises a focus detection unit that executes focus detection for the photographic optical system at a focus detection position set within a photographic image plane of the photographic optical system; and the detection area setting unit sets the focus detection position as the detection area.

According to the 11th aspect of the present invention, an image-capturing device comprises: an image-capturing unit including a plurality of image-capturing pixels, that captures an image formed via a photographic optical system; a display unit that displays the image captured by the image-capturing unit; an operation member enabling a setting operation to be performed on the image captured by the image-capturing unit on display in order to set an enlargement area position of an enlargement area for an enlarged display; an area setting unit that sets a read area, which is a partial area within the image-capturing pixels, based upon the enlargement area position having been set; and a control unit that reads out image data in the read area set by the area setting unit and brings up on display at the display unit an enlarged image based upon image data obtained by slicing out some of the image data in the read area having been read out in correspondence to the enlargement area position in response to an enlarged display execution construction.

According to the 12th aspect of the present invention, in the image-capturing device according to the 11th aspect, it is preferred that: there are provided a first display mode in which an image is displayed based upon image data read out from all pixels present in the partial area within the image-capturing pixels and a second display mode in which an image is displayed based upon image data read out from some pixels culled from the image-capturing pixels; the display unit displays the image captured by the image-capturing unit in the first display mode or in the second display mode; the operation member allows the enlargement area position for the enlarged display to be set freely on the image captured by the image-capturing unit on display in the second display mode; the area setting unit sets the read area within the image-capturing pixels to be read out from in the first display mode based upon the enlargement area position; and the control unit brings up the enlarged image on display at the display unit in the first display mode.

According to the 13th aspect of the present invention, in the image-capturing device according to the 12th aspect, it is preferred that each time the enlargement area position is shifted via the operation member, the area setting unit makes a decision as to whether or not a switchover of the read area is required and switches the read area to a new read area corresponding to the shifted enlargement area position if the switchover is determined to be necessary.

According to the 14th aspect of the present invention, in the image-capturing device according to the 13th aspect, it is preferred that if the switchover of the read area is determined to be necessary by the area setting unit, the control unit controls the display unit so as to switch from the first display mode to the second display mode, indicate a post-shift enlarged display position by superimposing the post-shift enlarged display position upon the image captured via the image-capturing unit prior to the enlarged display, switch back to the first display mode and bring up an enlarged display of an image based upon image data sliced out from image data in the new read area in correspondence to the shifted enlargement area position.

According to the 15th aspect of the present invention, in the image-capturing device according to the 13th or the 14th aspect, it is preferred that if the switchover of the read area is determined to be unnecessary by the area setting unit, the control unit brings up on display at the display unit an image corresponding to image data sliced out from the image data in the read area in correspondence to the shifted enlargement area position.

According to the 16th aspect of the present invention, in the image-capturing device according to any one of the 12th through 15th aspects, it is preferred that the area setting unit sets the read area containing image data with a data volume thereof allowing a specific image data read speed to be sustained in the second display mode.

According to the 17th aspect of the present invention, in the image-capturing device according to any one of the 12th through 16th aspects, it is preferred that the area setting unit sets a plurality of read areas so as to allow the read areas to overlap one another.

According to the 18th aspect of the present invention, in the image-capturing device according to any one of the 12th through 17th aspects, it is preferred that the control unit brings up a display in the first display mode only when an enlarged display execution instruction indicates execution of an enlarged display at a magnification factor equal to or greater than a predetermined magnification factor.

According to the 19th aspect of the present invention, in the image-capturing device according to the 11th aspect, it is preferred that: there are provided a first display mode in which an image is displayed based upon image data read out from some pixels culled from pixels present in the partial area within the image-capturing pixels at a first reducing rate and a second display mode in which an image is displayed based upon image data read out from some pixels culled from the image-capturing pixels at a second reducing rate; the display unit displays the image captured by the image-capturing unit in the first display mode or in the second display mode; the operation member allows the enlargement area position for the enlarged display to be set freely on the image captured by the image-capturing unit on display in the second display mode; the area setting unit sets the read area within the image-capturing pixels to be read out from in the first display mode based upon the enlargement area position; and the control unit brings up the enlarged image on display at the display unit in the first display mode.

According to the 20th aspect of the present invention, in the image-capturing device according to any one of the 11th through 19th aspects, it is preferred that via the operation member, a position at which a focal adjustment state of the photographic optical system is to be detected is set within a photographic image plane of the image-capturing unit.

DESCRIPTION OF PREFERRED EMBODIMENT

First Embodiment

Figure 1:
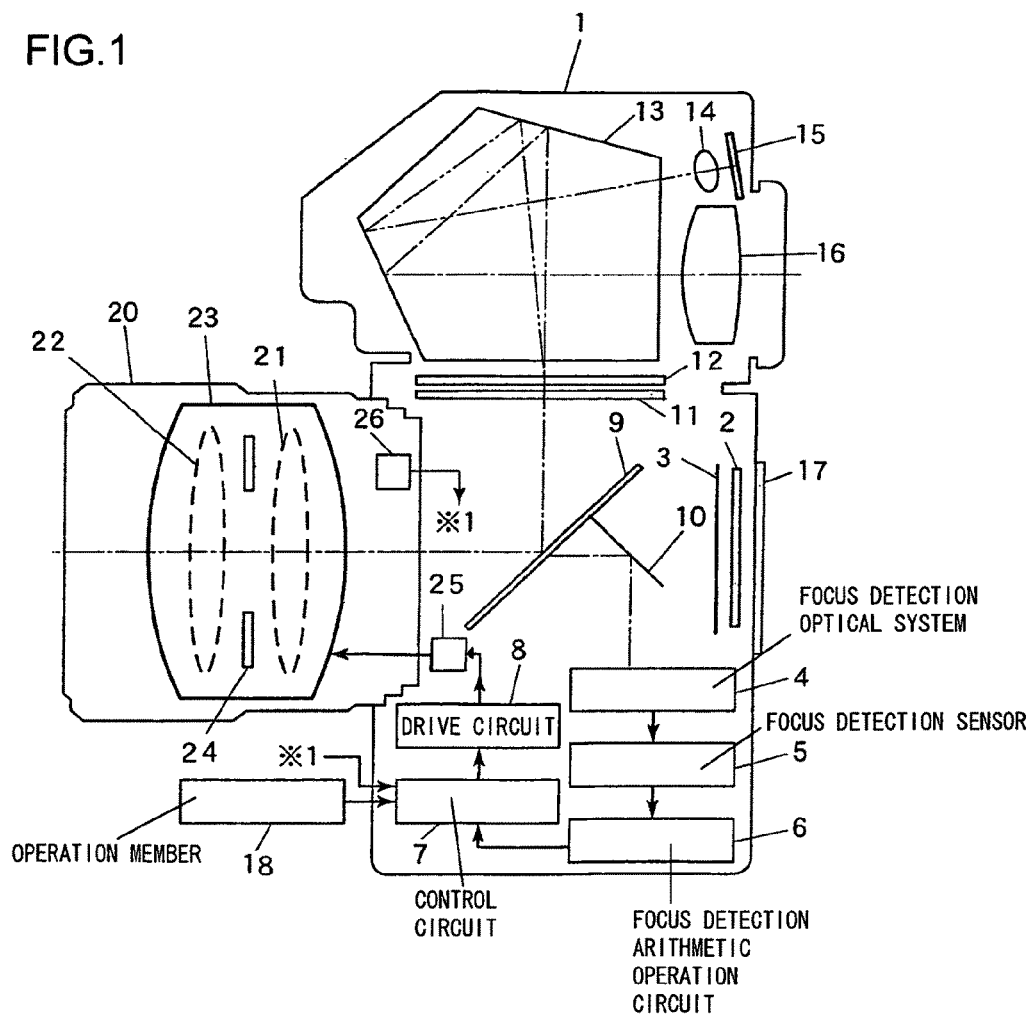
FIG. 1 shows the structure adopted in a single-lens reflex digital camera achieved in a first embodiment.

FIG. 1 shows the structure adopted in a single-lens reflex digital camera achieved in the first embodiment. The camera is equipped with an automatic focus adjusting device (hereinafter referred to as an AF device) which is a hybrid AF device adopting both the phase detection AF method (the phase difference detection AF method) and the contrast detection AF method. A lens barrel 20 is mounted at a camera body 1 in the camera achieved in the first embodiment. It is to be noted that while the first embodiment is described in reference to an example in which the present invention is adopted in a camera that allows the use of interchangeable lenses, the present invention is not limited to this example and it may instead be adopted in a camera with an integrated lens or a compact camera to achieve similar advantages. In addition, while the first embodiment is described in reference to an example in which the present invention is adopted in a digital camera (image-capturing device) equipped with a hybrid AF device, applications of the present invention are not limited to a digital camera equipped with a hybrid AF device and instead, it may be adopted in a digital camera equipped with either a phase detection AF device or a contrast detection AF device to achieve similar advantages.

At the camera body 1, an image sensor 2, a shutter 3, a focus detection optical system 4, a focus detection sensor 5, a focus detection arithmetic operation circuit 6, a camera control circuit 7, a drive circuit 8, a main mirror 9, a sub-mirror 10, a viewfinder screen 11, a viewfinder LCD 12, a pentaprism 13, a photometering lens 14, a photometering sensor 15, an eyepiece lens 16, an LCD color monitor 17, an operation member 18 and the like are disposed.

The image sensor 2, constituted with a CCD, a CMOS or the like, converts a subject image formed through a photographic lens 23 disposed in the lens barrel 20 to an electrical signal and outputs the electrical signal resulting from the conversion. The shutter 3 remains in the released (open) state over a length of time matching the shutter speed determined based upon the results of exposure calculation executed or manually selected by the photographer as a shutter release button (included in the operation member 18) is pressed all the way down (at the time of a shutter release), and the image sensor 2 is exposed while the shutter 3 remains in the released state. In addition, the shutter 3 enters the released state to expose the image sensor 2 when the contrast detection AF and the live view mode are both selected. The focus detection optical system 4, the focus detection sensor 5 and the focus detection arithmetic operation circuit 6 constitute a focus detection device that detects the focus through the phase detection method, with which a defocus amount indicating the state of focal adjustment at the photographic lens is detected.

The control circuit 7, which is constituted with a microcomputer and peripheral components such as a memory (none shown), executes sequence control under which photometering operation, focus detection, photographing operation and the like are executed, as well as arithmetic operation control under which the exposure calculation, focus evaluation value calculation adopting the contrast detection AF method and the like are executed. While a detailed explanation is provided later, the memory in the control circuit 7 is also utilized as a temporary storage device for temporarily storing image data read out from the image sensor 2. The drive circuit 8 controls the drive of lenses and an aperture drive actuator 25 disposed inside the camera body 1. At the viewfinder LCD 12, a focus detection area is superimposed upon the subject image displayed on the viewfinder screen 11 and photographic information such as the shutter speed, the aperture value and the number of pictures is displayed outside the subject image. The photometering sensor 15 outputs a photometering signal corresponding to the brightness in each of a plurality of areas defined by dividing the photographic image plane.

At the LCD monitor (a monochrome or color rear-side monitor) 17, disposed at the rear surface of the camera body 1, the subject image and the photographic information are displayed. The monitor 17 fulfills functions of displaying a reproduction of a previously photographed still image, displaying through images while dynamic image recording is in progress and displaying through images in a photographing standby state. The through image display is provided while dynamic image recording is in progress or in the photographing standby state by first executing image processing (enlargement processing, shift processing and the like to be detailed later) on through images output from the image sensor 2 in succession. Namely, a through image is a subject image brought up on display at the monitor 17 in real time.

While the image sensor 2 utilized to capture fine images fit for recording is equipped with a large number of pixels, the monitor 17 mounted at the camera does not include as many pixels as the image sensor 2. In other words, the data of all the pixels constituting an image captured via the image sensor 2 cannot be used for display at the monitor 17. Accordingly, the through image display is provided at the monitor 17 by using only some of the pixel data provided via the image sensor 2 through a culled read of the pixel data executed to read out image data with a volume matching the number of pixels available at the monitor 17.

At the lens barrel 20, a focusing lens 21, a zooming lens 22, an aperture 24, a lens memory 26 and the like are disposed. It is to be noted that FIG. 1 shows a single photographic lens 23 representing both the focusing lens 21 and the zooming lens 22. The focusing lens 21 is driven along the optical axis by the actuator 25 so as to adjust the focus of the photographic lens 23. The zooming lens 22 is driven by the actuator 25 along the optical axis in order to adjust the focal length of the photographic lens 23. As the aperture 24 is driven by the actuator 25, the aperture opening diameter is adjusted. In the lens memory 26, information related to the photographic optical system such as the full open F value and the focal length of the photographic lens 23 is stored. It is to be noted that an operation ring (not shown) via which the position of the focusing lens 21 can be manually adjusted in the manual focus mode is disposed at the lens barrel 20 as well.

The operation member 18 operated by the photographer is disposed at the camera body 1. The operation member 18 includes a shutter release halfway press switch which enters an ON state when the shutter release button is pressed halfway down, a shutter release full press switch that enters an ON state when the shutter release button is pressed all the way down, an area shift switch operated to shift the focus detection area, an image enlarge/reduce switch operated to enlarge or reduce the subject image displayed at the rear monitor 17 at a given magnification factor through image processing, a cursor switch operated to move up/down or left/right the cursor displayed at the rear monitor 17, a command dial with which a specific photographing mode such as a live view mode or an image absent portion display mode (to be detailed later) is selected, a contrast AF switch operated to execute contrast detection AF by using the output from the image sensor 2, a phase AF switch operated to execute phase detection AF by using the output from the focus detection sensor 5 and the like.

It is to be noted that the operation member may further include a manual focus switch to be operated to adjust the position of the focusing lens. As such a manual focus switch is operated by the photographer, the focusing lens 21 will be driven by the actuator 25 along the optical axis in correspondence to the extent to which the manual focus switch has been operated and the direction along which the manual focus switch has been operated.

In the first embodiment, the focus detection area is superimposed on the through image displayed at the rear monitor 17, the image portion contained in a predetermined range around the focus detection area position is displayed in an enlargement when providing an enlarged display through digital zoom and the focus detection area is shifted via the area shift switch in order to shift the enlarged display area for the digital zoom. It is to be noted that the position for the digital zoom enlarged display area may be selected and shifted by moving the cursor displayed in the through image at the rear monitor 17 with the cursor switch to bring up an enlarged display of the image contained in the predetermined range centered on the cursor position.

The main mirror 9 and the sub-mirror 10 are positioned in the photographic light path, as shown in FIG. 1, except when a photographing operation is in progress, the contrast detection AF is in progress, the through image display is provided, or dynamic image recording is underway. When the main mirror 9 and the sub-mirror 10 are set in the photographic light path, part of the light originating from the subject, having been transmitted through the photographic lens 23, is reflected at the main mirror 9 and is guided to the viewfinder screen 11 to form a subject image on the screen 11. This subject image is guided to the photographer's eye via the pentaprism 13 and the eyepiece lens 16 and is also guided to the photometering sensor 15 via the pentaprism 13 and the photometering lens 14. The control circuit 7 executes the exposure calculation based upon the photometering signals output from the photometering sensor 15 each in correspondence to one of the photometering areas, so as to calculate the shutter speed and the aperture value in correspondence to the brightness in the photographic image plane.

It is to be noted that the photographing operation is executed based upon the shutter speed and the aperture value having been set by the photographer via the operation member 18 in a manual exposure photographing mode. In addition, while an image is displayed at the monitor 17 after undergoing automatic adjustment of the photographic sensitivity executed by the control circuit 7 in correspondence to the optical axis of the subject in the through image display mode (live view mode), a predetermined special shutter speed is set in this mode (a special shutter speed is set during the through image display). It is to be noted that the through image display is provided at the aperture value calculated through the exposure calculation or at the aperture value selected via the operation member 18.

An other portion of the subject light having passed through the photographic lens is transmitted through the main mirror 9, is reflected at the sub-mirror 10 and is guided to the focus detection sensor 5 via the focus detection optical system 4. A plurality of focus detection areas are set within the photographic image plane and the focus detection sensor 5 outputs a focus detection signal indicating the focal adjustment state of the photographic lens 23 in correspondence to each focus detection area in the first embodiment. Based upon the focus detection signals provided in correspondence to the individual focus detection areas, the focus detection arithmetic operation circuit 6 calculates a defocus quantity indicating the focal adjustment state of the photographic lens 23. The control circuit 7 calculates a lens drive quantity based upon the defocus quantity and then drives the actuator 25 via the drive circuit 8 to drive the focusing lens 21 to the focus match position.

When a photographing operation is in progress, when the contrast detection AF is in progress, or when the live view mode is selected, the main mirror 9 and the sub-mirror 10 are positioned outside the photographic light path (mirror up) and the shutter 3 opens to allow the light fluxes from the subject having been transmitted through the photographic lens 23 to be guided to the image sensor 2. The contrast detection AF is executed by detecting the focus match position based upon the pixel outputs from a focus detection area at the image sensor 2 and driving the actuator 25 via the drive circuit 8 so as to drive the focusing lens 21 to achieve a focus match. In addition, the photographing operation is executed via the image sensor 2.

Figure 2:
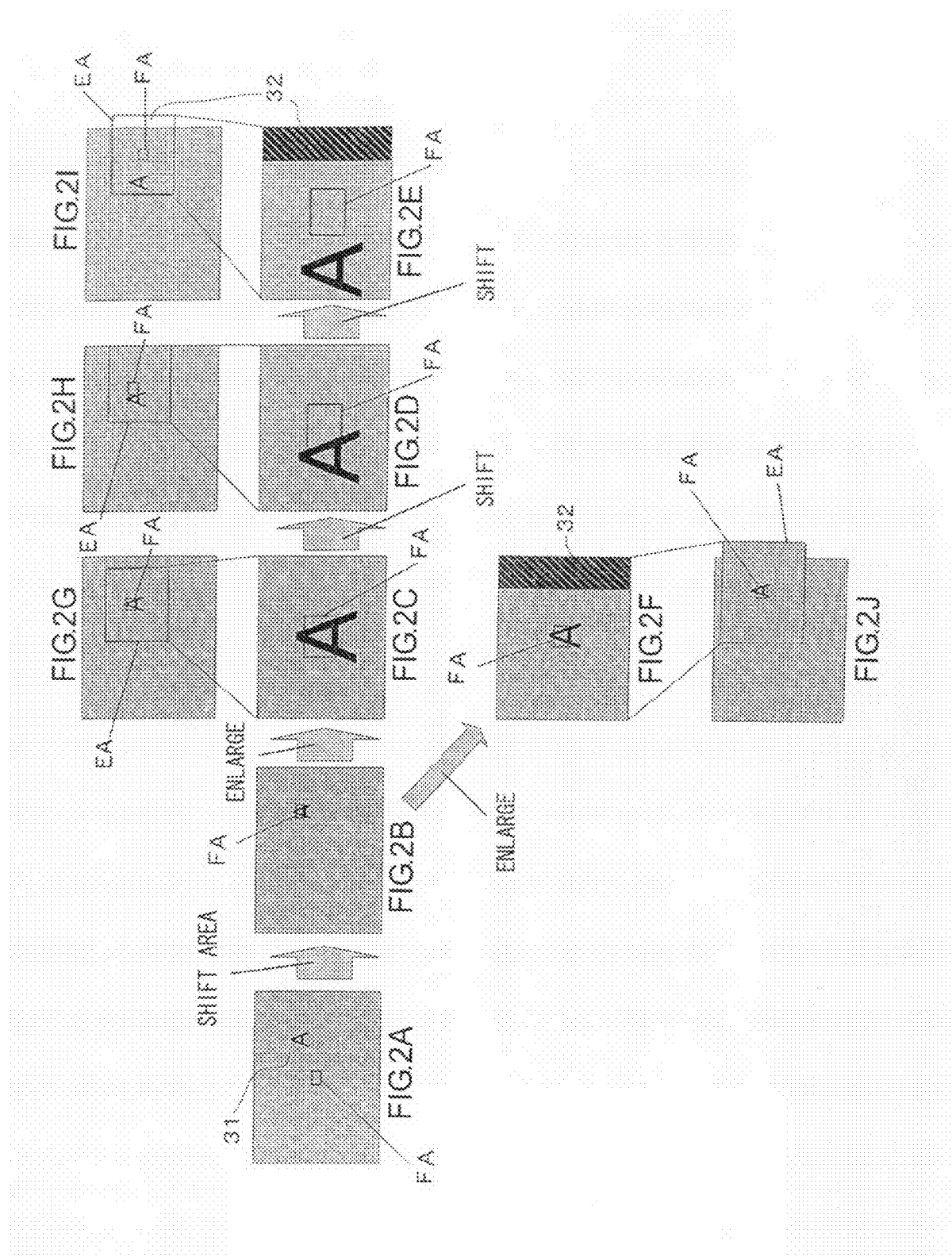
FIGS. 2A through 2J illustrate how the live view image changes as the image is enlarged and the focus area is shifted in the live view mode.

FIGS. 2A through 2I illustrate how the live view image (through image) changes as the image (through image) viewed in the live view mode is enlarged and the focus area FA shifts. The live view image is displayed at the LCD color monitor 17 at the camera rear surface and the figures present an example in which an image of a subject which is the alphabet character "A" (indicated by reference numeral 31 in FIG. 2A) is displayed. FIG. 2A illustrates the whole image (image constituted with the effective pixels) photographed via the image sensor 2 displayed at the monitor screen. In this image display, the focus area FA defined by the quadrangular frame is located at the center of the monitor screen. As an operation for shifting the focus area FA to the position of "the subject A" is performed in this state, the focus area alone is shifted from the center of the monitor screen to the position of the subject A without moving the display image itself, as shown in FIG. 2B.

As the image enlarge/reduce switch at the operation member 18 is operated to enlarge the image while the through image is on display, as shown in FIG. 2B, an image within an enlargement area EA (see FIG. 2G) containing the focus area FA is sliced out together with the focus area FA for purposes of enlargement through image processing executed by the control circuit 7 while the focus area FA is shifted to the monitor screen center, as shown in FIG. 2C. If the image set for the enlargement (the image in the enlargement area EA) to be brought up on display in an enlargement on the monitor screen exceeds the range of the photographic image, as shown in FIG. 2J, an excess portion 32 outside the photographic image range is displayed within the monitor screen in a distinct color or with a distinct pattern so that it can be easily distinguished by the photographer in the monitor screen, as shown in FIG. 2F. In the description, the portion 32 is referred to as a subject image absent portion.

As the focus area FA is shifted via the area shift switch at the operation member 18 (as an operation for shifting the area FA to the right, i.e., shifting the enlargement area EA to the right) in the state shown in FIG. 2C, the control circuit 7 executes image processing so as to shift the display image (the position of the enlargement area EA (see FIG. 2H)) while holding the position of the focus area FA at the monitor screen center, as shown in FIG. 2D. FIG. 2D shows a state in which the display image (enlargement area EA) is shifted to the right end of the range of the photographed image, and the display image (enlargement area EA) is shifted with the focus area FA held at the monitor screen center in response to a further shift operation performed to shift the focus area FA via the area shift switch in this state, as shown in FIG. 2H. The display image (enlargement area EA) thus comes to range beyond the photographic image range, as shown in FIG. 2I and, as a result, the subject image absent portion 32 is displayed in the monitor screen as shown in FIG. 2E.

By displaying the focus area FA at the monitor screen center at all times during the enlarged live view image display as described above, the photographer is able to check the focusing state around the focus area FA as well as the focusing state inside the focus area FA where the focus needs to be adjusted most accurately. Then, as the contrast AF switch at the operation member 18 is turned on in the state shown in FIG. 2E, the contrast AF is executed over the focus area FA in FIG. 2E via the image sensor 2 and the image resulting from the AF (an enlarged image such as that shown in FIG. 2E) is brought up on display at the monitor screen. Upon ascertaining that a focus match has not been achieved in the focus area FA by checking the display, the user may switch to the manual focus mode to perform a manual focusing operation via the operation ring at the lens barrel or via the manual focus switch at the camera (while verifying the focusing state through the enlarged display on the monitor screen). Then, the user may press the shutter release button all the way down in the focus match state (achieved through the manual focusing operation) to obtain an image achieving a focus match state in the shifted AF area with a high level of reliability and thus, the need to perform a photographing operation again due to a failure to achieve focus match is eliminated. It is to be noted that if a focus match cannot be achieved by turning on the contrast AF switch over the focus area FA shown in FIG. 2E, a message indicating the focus match failure may be brought up on display at the monitor 17 together with a message prompting the photographer to switch to the manual focus mode.

FIGS. 2A through 2J present an example in which the subject image absent portion 32 corresponding to the portion of the display image in the monitor screen ranging beyond the photographic image range is displayed in a distinct display color or with a distinct pattern so as to allow the photographer to easily recognize the subject image absent portion as the live view image is enlarged and the focus area FA is shifted. As an alternative, the display image shift range may be restricted so as to ensure that the image display range does not shift beyond the photographic image range and accordingly, the display image may be shifted without displaying the subject image absent portion 32 in the monitor screen and the focus area FA may be shifted from the monitor screen center position as necessary instead.

Figure 3:
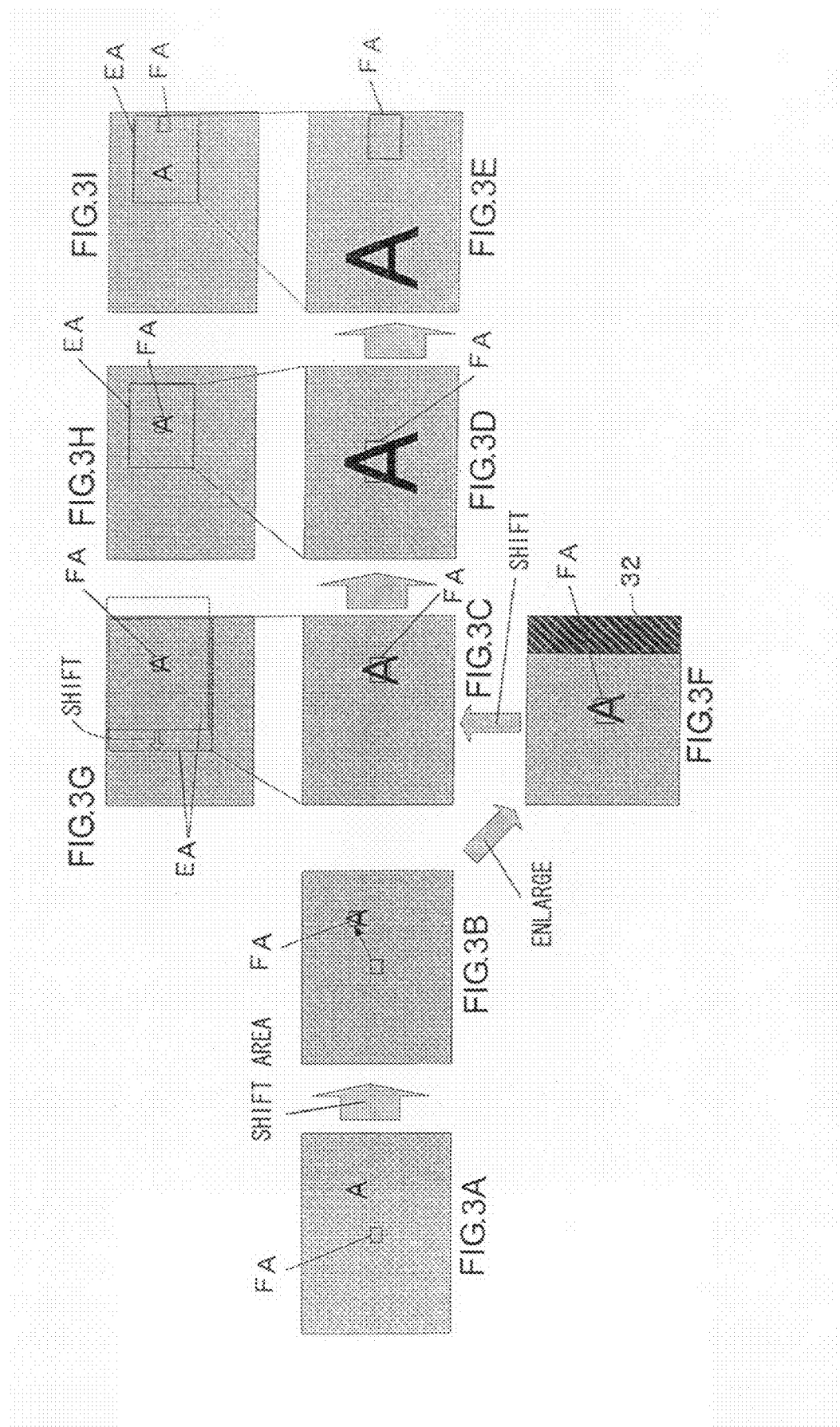
FIGS. 3A through 3I illustrate how the live view image changes as the image is enlarged and the focus area is shifted in the live view mode when the subject image absent portion is not displayed on the monitor screen.

FIGS. 3A through 3I illustrate how the live view image (through image) changes as the image (through image) viewed in the live view mode is enlarged and the focus area FA shifts when the subject image absent portion is not displayed at the monitor screen. The figures present an example in which an image of a subject which is the alphabet character "A" is displayed, as in the example presented in FIGS. 2A through 2J. FIG. 3A illustrates the whole image photographed via the image sensor 2 displayed at the monitor screen. In this image display, the focus area FA defined by the quadrangular frame is located at the center of the monitor screen. The AF area position is indicated immediately after a live view display start by reflecting the most recent phase AF area position or the most recent contrast AF area position. As an operation for shifting the focus area FA to the position of "subject A" is performed in this state, the focus area alone is shifted from the center of the monitor screen to the position of the subject A without moving the display image itself, as shown in FIG. 3B.

As an image enlarge operation is performed via the image enlarge/reduce switch while the live view image is on display as shown in FIG. 3B, the control circuit 7 executes image processing so as to enlarge the image in the enlargement area EA (see FIG. 3G) containing the focus area FA, together with the focus area FA, while shifting the focus area FA toward the monitor screen center, as shown in FIG. 3F. However, if the display image ranges beyond the photographic image range in the monitor screen, the control circuit shifts the display image range (enlargement area EA) to the position where the photographed image is present, as shown in FIG. 3G so as to ensure that the subject image absent portion 32 ranging beyond the photographic image range does not appear in the monitor screen, as shown in FIG. 3C. As a result, the subject A and the focus area FA shift from the monitor screen center, as shown in FIG. 3C.

As a live view image enlarge operation (an operation for further raising the enlargement factor to a level higher than the enlargement factor in FIG. 3C) is performed via the image enlarge/reduce switch in the state shown in FIG. 3C, the control circuit 7 executes image processing so as to enlarge the image in the enlargement area EA ranging around the focus area FA, as shown in FIGS. 3H and 3D. If a further operation is performed to shift the focus area FA via the area shift switch (an operation for shifting the area FA to the right, i.e., an operation for shifting the enlargement area EA to the right) in the state shown in FIG. 3D and the display image shifts to the right end of the photographic image range, as shown in FIG. 3I, the display image cannot be shifted further. If the photographer continues to perform a right shift operation to shift the area FA to the right via the area shift switch, the focus area is shifted to the right without moving the display image at all, as shown in FIG. 3E. Then, as has been described in reference to FIGS. 2A through 2J, the camera is engaged in operation in response to an ON operation of the contrast AF switch performed in the state shown in FIG. 3E and the manual AF mode is selected if a focus match state cannot be achieved.

Figure 4:
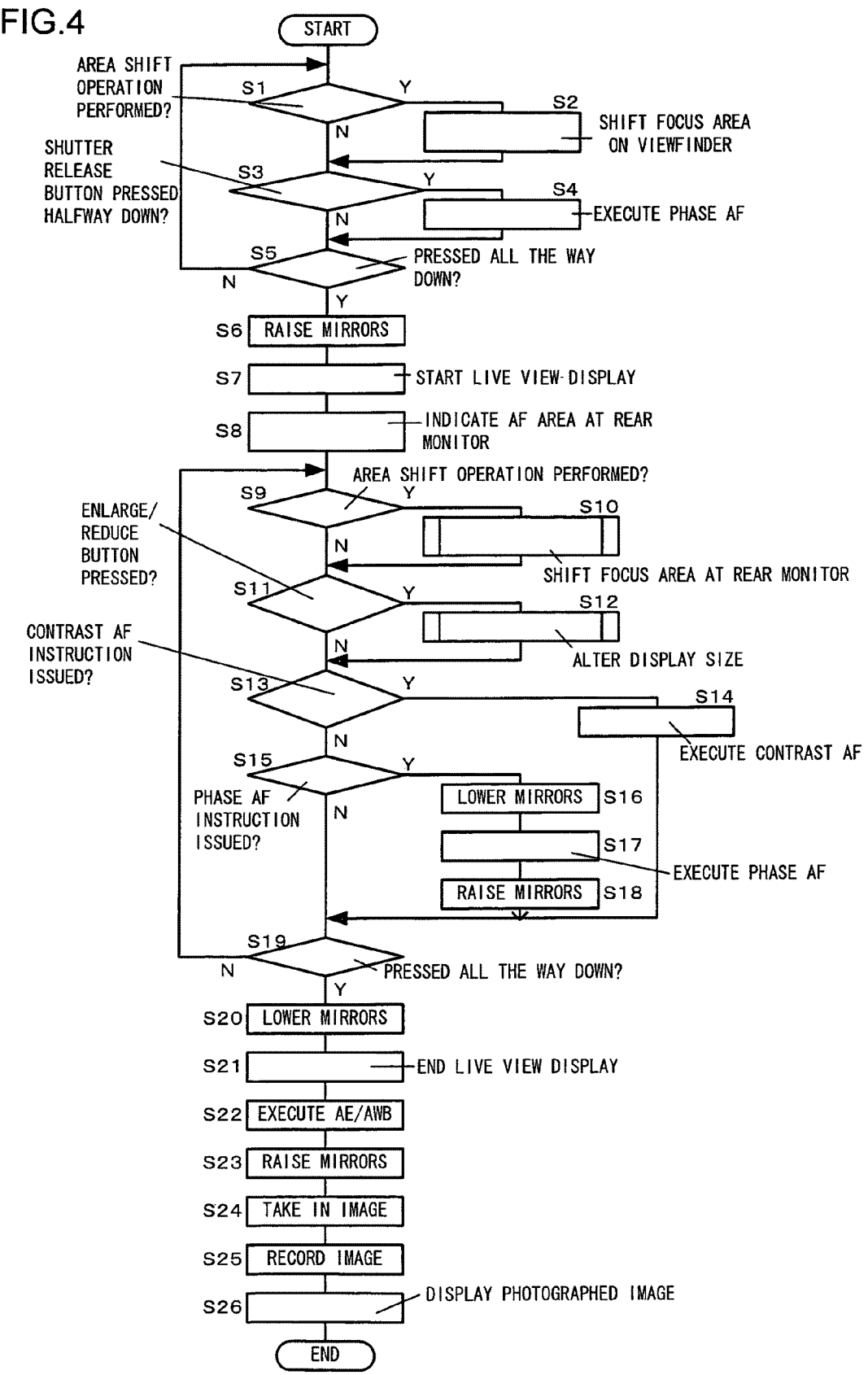
FIG. 4 presents a flowchart of the photographing processing executed in the first embodiment.

FIG. 4 presents a flowchart of the photographing processing executed in the first embodiment. The camera control circuit 7 executes a photographing processing as the live view mode is selected via the command dial at the operation member 18. In step 1, a verification is executed to determine whether or not the focus detection area has been altered via the area shift switch at the operation member 18, and if it is decided that the area has been changed, the operation proceeds to step 2. In step 2, the focus detection area on display is shifted via the viewfinder LCD 12 in response to the operation at the area shift switch. The focus detection area shifted in step 2, is a focus detection area selected on the focus detection sensor 5. In step 3, a decision is made as to whether or not the shutter release switch has been pressed halfway down via the shutter release halfway press switch at the operation member 18, and if a halfway press operation has been performed, the operation proceeds to step 4. In step 4, the phase detection AF is executed in the focus detection area having been selected through the processing in steps 1 and 2 and the focusing lens 21 is driven for purposes of focal adjustment via the drive circuit 8 and the actuator 25.

In step 5, a decision is made as to whether or not the shutter release button has been pressed all the way down via the shutter release full press switch at the operation member 18 and the operation proceeds to step 6 if a full press operation has been detected. The operation, however, returns to step 1 to repeatedly execute the processing described above if it is decided that a full press operation has not been performed. In step 6, to which the operation proceeds after determining that a full press operation has been performed, the main mirror 9 and the sub-mirror 10 are made to move out of the photographic light path (mirror up), and in the following step 7, a live view display of the image photographed via the image sensor 2 starts at the monitor 17. In step 8, the currently selected focus detection area (selected through the processing executed in steps 1 and 2) is indicated by superimposing the selected focus detection area on the through image at the monitor 17. The focus detection area brought up on display at this time is centered by substituting a focus detection area on the image sensor 2 utilized in the contrast detection AF for the focus detection area on the focus detection sensor 5 having been selected through the processing in steps 1 and 2, as described earlier (i.e., the area on the image sensor 2 assuming a position matching that of the area selected in steps 1 and 2 is displayed as the focus detection area). It is to be noted that the phase AF area and the contrast AF area may range over areas the size of which are different from each other and, in such a case, the substitution described above is implemented by ensuring that the gravitational center positions (central positions) of the two areas are identical with each other.

It is to be noted that while the operation shifts into the live view mode in response to a depression of the shutter release button in the embodiment, a dedicated live view button may be provided independently of the shutter release button. In such a case, the operation in steps 3 through 5 is executed in response to an ON operation of the live view button (live view switch) in the processing flow shown in FIG. 4.

Figure 5:
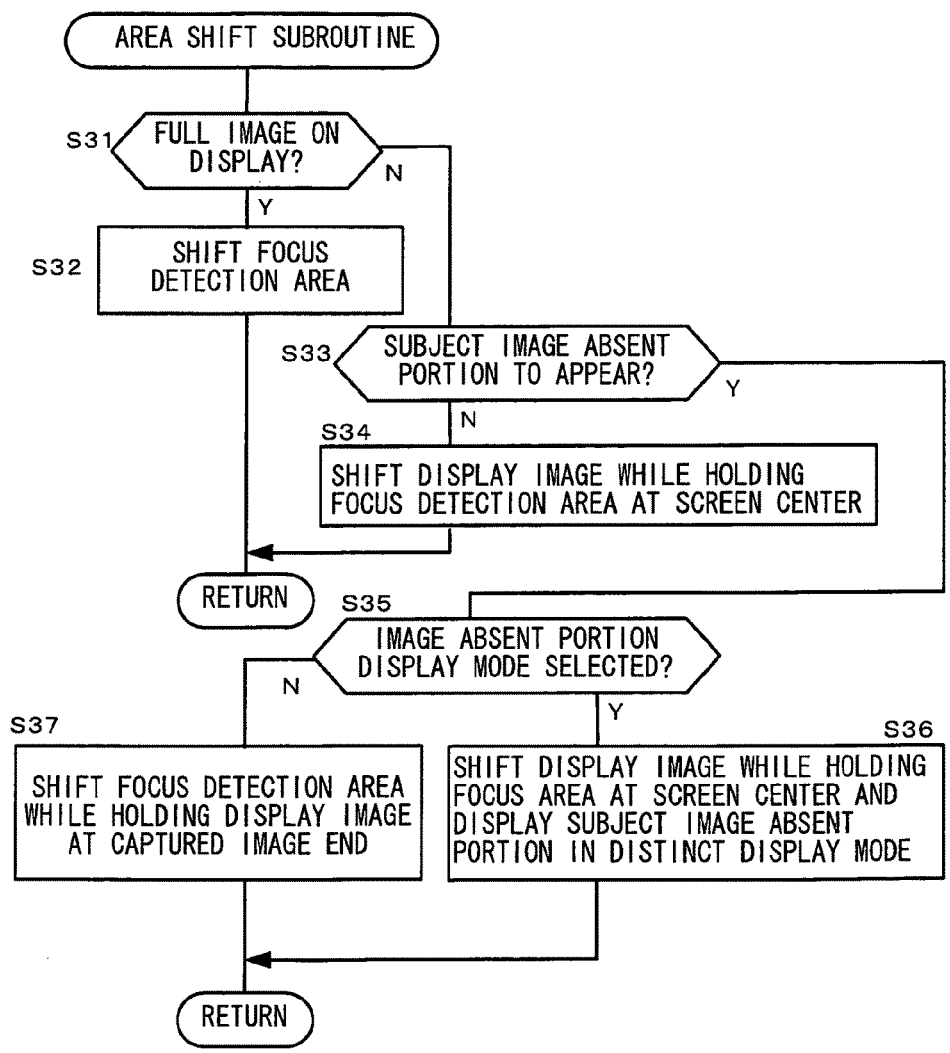
FIG. 5 presents a flowchart of the area shift subroutine executed in the first embodiment.

In step 9, a verification is executed to determine whether or not the focus detection area FA has been altered (i.e., the enlargement area EA has been altered) via the area shift switch at the operation member 18 and the operation proceeds to step 10 if it is decided that the area has been altered, to execute the area shift subroutine shown in FIG. 5.

In step 31 in FIG. 5, a verification is executed to determine whether or not the image photographed via the image sensor 2 is currently on display in its entirety at the monitor 17, and the operation proceeds to step 32 if it is decided that the photographed image is on display in its entirety. In step 32, the focus detection area FA on the image sensor 2 utilized in the contrast detection AF is shifted in response to an operation of the area shift switch at the operation member 18. For instance, the focus detection area FA may be shifted from the position shown in FIG. 2A to the position shown in FIG. 2B. The focus area can be shifted continuously on the image sensor 2 with a finer shift increment than the shift increment with which the focus area is shifted on the focus detection sensor 5 in steps 1 and 2 explained earlier (the focus area on the image sensor can be shifted even in units of single pixels).

If it is decided in step 31 that the photographed image is not displayed in its entirety, i.e., if the photographed image is currently displayed in an enlarged display, the operation proceeds to step 33 to make a decision as to whether or not the display image (image in the enlargement area EA) will range beyond the photographic image range and a subject image absent portion will be displayed in the monitor screen if the display image (enlargement area EA) is shifted in response to the focus detection area shift operation instructing a shift of the focus detection area in the enlarged display. Namely, a decision is made as to whether or not the subject image absent portion 32 will appear in the monitor screen as shown in FIG. 2E if the focus detection area in the enlarged display in FIG. 2D is shifted.

If it is decided that no subject image absent portion will appear in the monitor screen even if the focus detection area in the enlarged display is shifted, the operation proceeds to step 34 to shift the display image in response to the focus detection area shift operation while holding the focus detection area FA at the center of the monitor screen. Namely, as the focus detection area shift operation is performed while the enlarged display is up, as shown in FIG. 2C, the display image (enlargement area EA) is shifted through image processing while the focus detection area FA is held at the monitor screen center, as shown in FIG. 2D.

If it is decided in step 33 that a subject image absent portion will appear in the monitor screen as a result of the shift of the focus detection area in the current enlarged display, the operation proceeds to step 35 to make a decision as to whether or not an "image absent portion display mode" (the display mode described in reference to FIGS. 2A through 2J), which allows the subject image absent portion to be displayed in the monitor screen, is currently on. If it is decided that the image absent portion display mode is on, the operation proceeds to step 36 to shift the display image (the image in the enlargement area EA) while the focus area FA is held at the monitor screen center and indicate the subject image absent portion by using a distinct display color or a distinct pattern so as to facilitate recognition thereof by the photographer, as shown in FIGS. 2I and 2E.

If, on the other hand, it is decided that the image absent portion display mode is not currently on, the operation proceeds to step 37. In this case, once the display image (the image in the enlargement area EA) is shifted to the end of the photographic image range, the focus detection area FA is shifted with the display image (enlargement area EA) held at the photographic image range end, as shown in FIGS. 3I and 3E. Once the processing for shifting the focus detection area FA ends, the operation returns to step 11 in FIG. 4.

A decision is made in step 11 in FIG. 4 as to whether or not an operation has been performed via the image enlarge/reduce switch at the operation member 18 for enlarging or reducing the live view image (through image). If it is decided that an enlarge/reduce operation has been performed, the operation proceeds to step 12. In step 12, the enlarge/reduce subroutine shown in FIG. 6 is executed.

Figure 6:
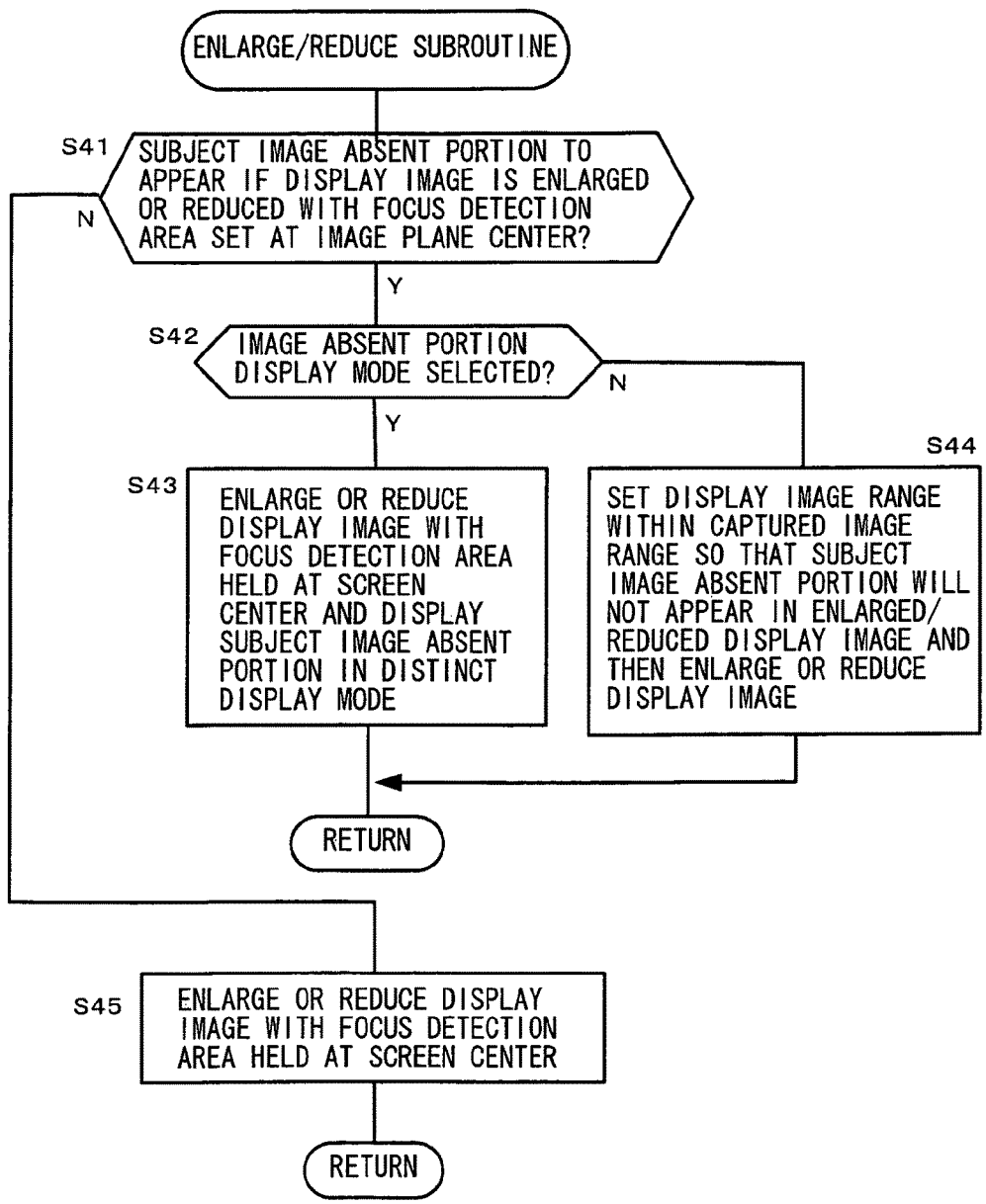
FIG. 6 presents a flowchart of the enlarge/reduce subroutine executed in the first embodiment.

A decision is made in step 41 in FIG. 6 as to whether or not a subject image absent portion will appear in the monitor screen if the display image is enlarged or reduced by holding the focus detection area FA at the monitor screen center. If it is decided that no subject image absent portion will appear, the operation proceeds to step 45 to enlarge or reduce the display image through image processing while the focus detection area is held at the monitor screen center.

If, on the other hand, it is decided that a subject image absent portion will appear in the monitor screen, the operation proceeds to step 42 to execute a verification to determine whether or not the image absent portion display mode has been selected via the command dial at the operation member 18. If the image absent portion display mode has been selected, the operation proceeds to step 43 to enlarge or reduce the display image through image processing while holding the focus detection area FA at the monitor screen central position and display the subject image absent portion in a distinct color or with a distinct pattern so as to facilitate recognition thereof by the photographer. In the example presented in FIGS. 2A through 2J, the subject image absent portion 32 will appear as shown in FIG. 2F in the monitor screen if the image in FIG. 2B is enlarged and, accordingly, the subject image absent portion 32 is displayed in a distinct display color or with a distinct pattern to enable easy recognition thereof by the photographer.

If, on the other hand, it is decided that the image absent portion display mode has not been selected, the operation proceeds to step 44 to set the display image range within the captured image range so as not to allow any subject image absent portion to appear in the monitor screen when the display image is enlarged or reduced and then enlarge or reduce the display image through image processing. In the example presented in FIGS. 3A through 3I, the subject image absent portion 32 will appear as shown in FIG. 3F if the image (enlargement area EA) in FIG. 3B is enlarged without a shift and, accordingly, the display image range (enlargement area EA) is shifted within the captured image range, as shown in FIG. 3G to ensure that no subject image absent portion will appear in the monitor screen, as shown in FIG. 3C. Once the display image enlarge processing or reduce processing ends, the operation returns to step S13 in FIG. 4.

In step 13 in FIG. 4, a verification is executed to determine whether or not an instruction for contrast detection AF execution has been issued via the contrast AF switch at the operation member 18. If a contrast detection AF execution instruction has been issued, the operation proceeds to step 14 to execute a contrast detection AF operation. Namely, a photographing operation is executed via the image sensor 2 while driving the focusing lens 21 in predetermined increments and a focus evaluation value is calculated. Then, the focusing lens 21 is driven to the focus match position at which the largest focus evaluation value is achieved. Once the contrast detection AF is executed, the operation proceeds to step 19.

If, on the other hand, it is decided that no contrast detection AF execution instruction has been issued, the operation proceeds to step 15 to execute a verification to determine whether or not an instruction for phase detection AF execution has been issued through an operation of the phase AF switch. If it is decided that a phase detection AF execution instruction has been issued, the operation proceeds to step 16 to position the main mirror 9 and the sub-mirror into the photographic light path (mirror down). Then the defocusing quantity indicating the extent of defocusing manifested by the photographic lens 23 is detected via the focus detection optical system 4, the focus detection sensor 5 and the focus detection arithmetic operation circuit 6, the lens drive quantity is calculated based upon the defocusing quantity and the focusing lens 21 is driven based upon the lens drive quantity in step 17. Once the phase detection AF ends, the main mirror 9 and the sub-mirror 10 are made to retreat from the photographic light path (mirror up) in step 18. It is to be noted that if the focus area FA has been altered through steps 9 and 10 described earlier, the defocusing quantity is detected in step 17 for the focus area on the focus detection sensor 5, the position of which matches that of the altered focus area on the image sensor 2 or the focus area on the focus detection sensor 5 the position of which is closest to the position of the altered focus area on the image sensor 2.

It is also to be noted that while instructions for the executions of the contrast detection AF and the phase detection AF are issued via separate operation members in the first embodiment, the instructions for their executions may be issued via a common operation member instead. In such a case, the common operation member should be customized so that an instruction for a specific method of AF is selected at a given setting. For instance, the common operation member may be customized so that the phase detection AF is automatically selected in, for instance, the "handheld photographing mode" and that the contrast detection AF is automatically selected in the "held photographing mode". In this case, if the common operation member is operated in the handheld photographing mode, the phase detection AF will be executed and if the common operation member is operated in the held photographing mode, the contrast detection AF will be executed.

In step 19, a verification is executed to determine via the shutter release full press switch at the operation member 18 as to whether or not the shutter release button has been pressed all the way down. If it is decided that the shutter release button has not been pressed all the way down, the operation returns to step 9 to repeatedly execute the processing described above. If, on the other hand, it is decided that the shutter release button has been pressed all the way down, the operation proceeds to step 20 to move the main mirror 9 and the sub-mirror 10 back into the photographic light path (mirror down), and in the following step 21, the live view display at the monitor 17 ends. In step 22, exposure control is executed based upon the subject brightness detected via the photometering sensor 15 and also, white balance control is executed. As this operational flow clearly indicates, unless a specific operation is performed to display the image photographed via the image sensor 2 in its entirety on the screen of the monitor 17, the photographer is allowed to press the shutter release button all the way down while the image having been shifted in step 10 remains on display at the monitor 17 or the image having been altered (enlarged) in step 12 remains on display at the monitor 17 (i.e., a shutter release can be performed while the enlarged image is still on display).

It is to be noted that the phase detection AF having been described earlier in reference to step 17 may be executed during a period in which the processing in step S20 through 22 is executed. However, it is desirable that AF not be executed again during the period elapsing between steps 20 and 22 if the contrast detection AF operation was executed in step 14.

In step 23, the main mirror 9 and the sub-mirror 10 are made to retreat from the photographic light path (mirror up) and then in step 24, the image having been photographed via the image sensor 2 is taken in. The photographed image is recorded into a recording medium (not shown) in step 25, and the photographed image is brought up on display at the monitor 17 in step 26.

As described above, in response to an instruction for shifting the position of the enlargement area EA the subject image corresponding to which is currently on display in an enlargement and the position of which has been specified for the enlarged display in the subject image displayed as a through image, the enlargement area EA is shifted while the subject image enlarged display state is sustained and the subject image corresponding to the new enlargement area EA is brought up on display in an enlargement in the first embodiment. This allows the photographer to easily check the focusing state or the state of image blurring at any position within the photographic image plane, prior to the actual photographing operation. As a result, upon ascertaining that the focusing state, for instance, is not ideal, the photographer is able to take optimal action prior to the photographing operation (e.g., executing the AF operation again at the particular position or manually adjusting the focus).

In addition, the subject image absent portion 32 appearing in the display screen as a result of bringing up on display an enlarged subject image contained in a specific enlargement area EA is displayed in a display mode that allows the photographer to recognize the absent portion and, as a result, the photographic range can be ascertained with clarity in the first embodiment.

In the first embodiment, the enlargement area EA is set so as to set the focus detection position FA at the display screen center, allowing the photographer to check the focusing state or the state of image blurring at the most crucial focus detection position and over a wide area containing the focus detection position.

In the first embodiment, a decision is made as to whether or not the subject image absent portion 32 will appear in the display screen if the subject image in the selected enlargement area EA is brought up on display in an enlargement, and if it is decided that the absent portion 32 will appear, the enlargement area EA is altered so as not to allow the absent portion 32 to appear in the display screen, enabling verification of the focusing state or the state of image blurring over a wide image range within the photographic range.

In addition, the enlargement area EA containing the focus detection position FA is set and the enlargement area EA is shifted as the focus detection position FA shifts, enabling verification of the focusing state or the state of image blurring in the vicinity of the focus detection position in the first embodiment. It is to be noted that an enlargement area EA containing a position at which any of various types of photographic information is to be detected, e.g., a photometering position in the photographic image plane, instead of the focus detection position FA, may be set. In such case, the focusing state around the position at which the photographic information is to be detected within the photographic image plane can be checked.

It is to be noted that the present invention may be adopted in a compact camera instead of a single-lens reflex camera.

Furthermore, while the enlarged image (see, for instance, FIG. 2C) is displayed in place of the whole image (see FIG. 2B) in the screen at the monitor 17 in the embodiment, the present invention is not limited to this example. For instance, the screen at the monitor 17 may be used for a split-screen display, so as to display the whole image in one part of the split screen and the enlarged image in the other part of the split screen. Alternatively, a small screen (thumbnail screen) may be displayed within the screen at the monitor 17 so as to display either the full image or the enlarged image in the small screen and the other image in the other larger screen.

Second Embodiment

Since the single-lens reflex digital camera in the second embodiment assumes a structure similar to that of the single-lens reflex digital camera in the first embodiment having already been explained in reference to FIG. 1, an explanation is omitted. However, while the switch, operated to enlarge or reduce the subject image displayed at the rear monitor 17 with a selected magnification factor through image processing, is referred to as the image enlarge/reduce switch in the description of the first embodiment, the same switch is simply referred to as an enlarge switch in the description of the second embodiment.

Figure 7:
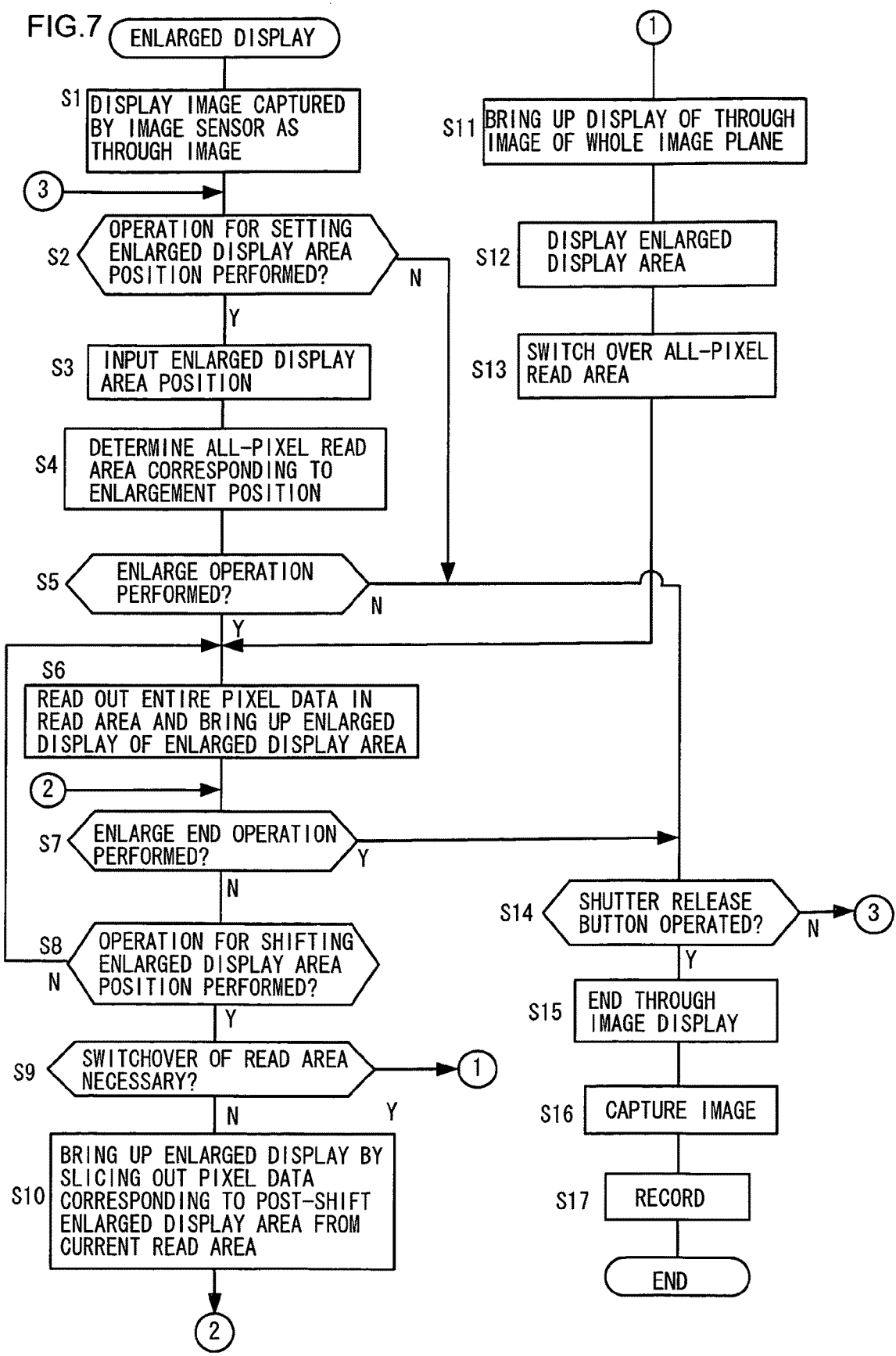
FIG. 7 presents a flowchart of the enlarged display processing executed in a second embodiment.
Figure 8:
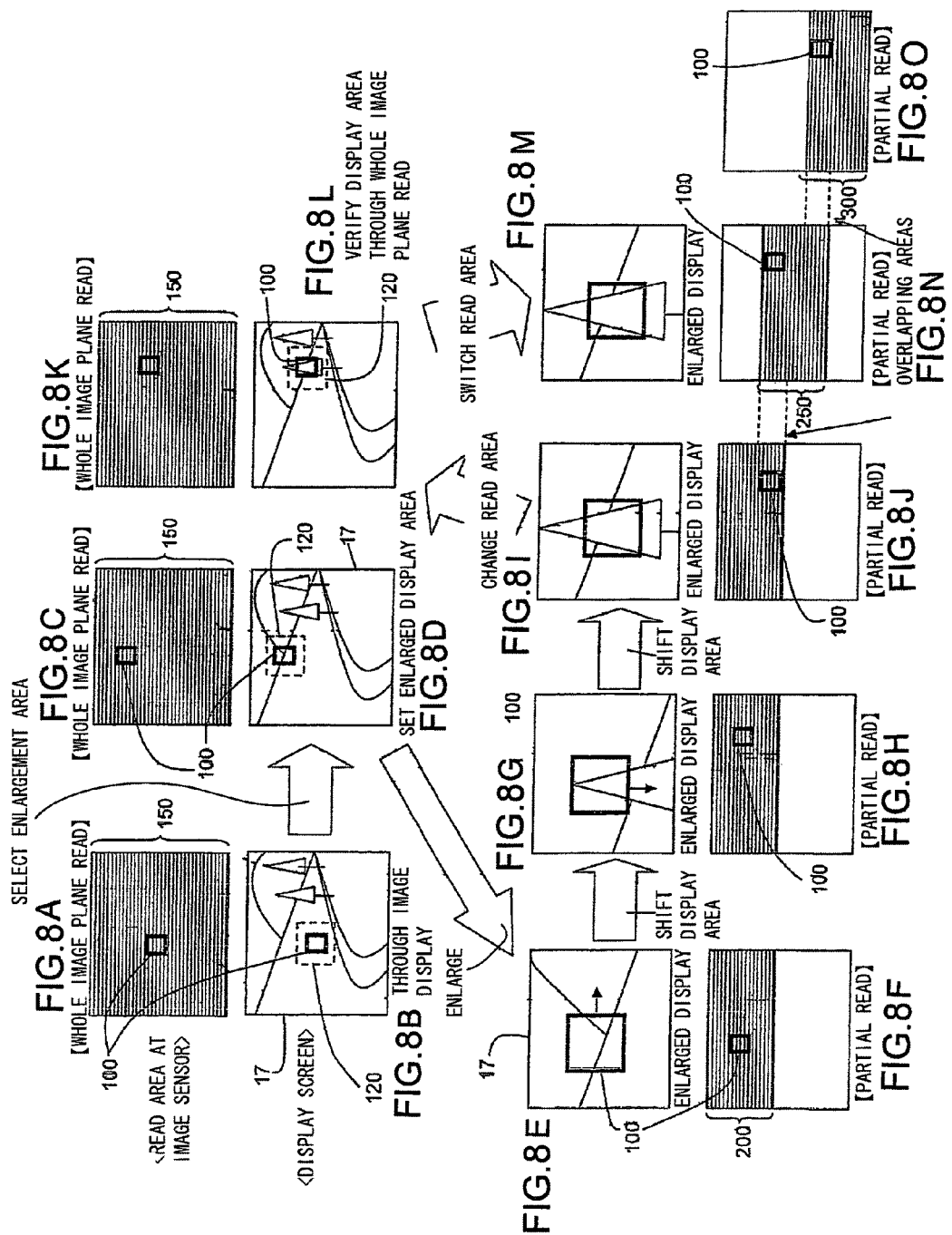
FIGS. 8A through 8O present an example of the enlarged display.

FIG. 7 presents a flowchart of the enlarged display processing executed in the second embodiment. In addition, the data read area over which pixel data from the image sensor 2 are read out and the display brought up at the monitor 17 during the enlarged display processing executed in the second embodiment are illustrated in FIGS. 8A through 8O. In FIGS. 8A through 8O, an area 100 enclosed by the black frame is a focus detection area indicating the enlargement position and the hatched area indicates the image data read area. In reference to these figures, the operation executed in the second embodiment is explained. It is to be noted that the enlarged display area to be detailed later is a specific predetermined area (area 120 indicated by the dotted line in FIGS. 8A and 8B) which ranges around the focus detection area 100. It is assumed that while the focus detection area 100 is superimposed over the through image at the monitor 17, no special display indicating the area 120 is brought up on the monitor 17 in the embodiment.

In step 1, the image having been captured at the image sensor 1 is displayed as a through image at the rear monitor 17. The image data are read out from the image sensor 2 over the entire range 150 of the image plane, as shown in FIG. 8A at this time. Then, some of the image data over the whole image plane range are read out through a culled read (a sub-sampling read) for reducing pixels so as to display the image data obtained through the culled read as a through image at the display screen of the monitor 17, as shown in FIG. 8B.

In the following step 2, a verification is executed to determine whether or not an operation for setting a specific enlarged display area position has been performed. As shown in FIGS. 8C and 8D, the enlarged display area 120 for a digital zoom enlarged display is adjusted by shifting the focus detection area 100 via the area shift switch at the operation member 18 in order to set the enlarged display area 120 at the desired position within the image-capturing plane of the image sensor 1 in the second embodiment. If it is decided that the position setting operation for the enlarged display area 120 (i.e., for the focus detection area 100) has not been performed via the area shift switch, the operation proceeds to step 14, whereas the operation proceeds to step 3 if it is decided that the position setting operation has been performed. The enlarged display area should be set by obtaining some of the image data corresponding to the whole image plane range 150 at the image sensor 2 through a culled read, as shown in FIG. 8C, displaying the image data thus obtained through the culled read at the monitor 17 as a through image, as shown in FIG. 8D, and then shifting the focus detection area 100 (indicated by the black frame) over the through image to set the enlargement display area 120 at the desired position.

In step 3, the position of the enlargement display area 120 (the center of the area 120 (the area 100)) having been set via the area shift switch at the operation member 18 is input and in the following step 4, an all-pixel read area at the image sensor 2, from which the pixel data at all the pixels present therein are to be read out, corresponding to the enlargement display area 120, is determined. In the second embodiment, the image-capturing plane at the image sensor 2 is divided into three read areas, i.e., an upper area 200, a central area 250 and a lower area 300, the boundaries of which are set so that the three read areas overlap one another. By setting their boundaries so that the read areas overlap one another, the enlarged display areas 120 can be switched smoothly. In this example, the enlarged display area 120 is set at an upper position in the image plane at the image sensor 2 by shifting the focus detection area 100 as shown in FIG. 8C and accordingly, the upper area 200 at the image sensor 2 is set as the read area, as shown in FIG. 8F.

It is to be noted that the image-capturing plane at the image sensor 2 may be divided into all-pixel read areas different from the upper area, the central area and the lower area in the second embodiment. For instance, the data can be accessed in units of individual pixels at the image sensor 2 constituted with a CMOS and, accordingly, a plurality of read areas may be set by dividing the image-capturing plane into a left area, a central area and a right area or by dividing it into areas defined by a plurality of concentric circles centered on the central point of the image-capturing plane. Among such read areas, the read area corresponding to the position of the enlarged display area 120 set via the area shift switch should be selected.

In step 5, a verification is executed to determine whether or not an enlarge operation has been performed to bring up an enlarged display through digital zoom. If the enlarge switch at the operation member 18 has been operated, the operation proceeds to step 6, whereas the operation proceeds to step 14 if the enlarge switch has not been operated. If the enlarge operation has been performed, the data from all the pixels present in the read area (200) at the image sensor 2 are read (see FIG. 8F) and an enlarged display is brought up at the monitor 17 by slicing out the pixel data contained in the enlarged display area 120, which are included in the pixel data having been read out (see FIG. 8E) in step 6. It is to be noted that the black frame 100 indicating the focus detection area, too, is enlarged in the enlarged display at the monitor 17, as shown in FIG. 8E.

In step 7, a verification is executed to determine whether or not an enlarge end operation has been performed. In the second embodiment, the enlarged display ends as the enlarge switch at the operation member 18 is operated again (ON operation) while the enlarged display is up. If the enlarged display end operation has not been performed, the operation proceeds to step 8, whereas the operation proceeds to step 14 if the enlarge end operation has been performed. If the enlarge end operation has not been performed, a verification is executed in step 8 to determine whether or not an operation for shifting the enlarged display area has been performed. If an enlarged display area shift operation has been performed via the area shift switch at the operation member 18, the operation proceeds to step 9, whereas the operation returns to step 6 if such a shift operation has not been performed.

If an enlarged display area shift operation has been performed, a verification is executed in step 9 to determine whether or not the read area needs to be switched in correspondence to the enlarged display area shift. If the enlarged display area 120 (the black frame indicator 100 indicating the focus detection area) following the shift is still inside the current read area 200, as shown in FIG. 8H, the read area does not need to be switched. However, if the enlarged display area 120 following the shift is outside the current read area and thus the read area needs to be switched, the operation proceeds to step 11. If the read area does not need to be switched, the operation proceeds to step 10. In step 10, to which the operation proceeds upon determining that the read area does not need to be switched, the pixel data contained in the post-shift enlarged display area are sliced out from the current read area and the pixel data over the enlarged display area thus obtained are used for an enlarged display at the monitor 17. Subsequently, the operation returns to step 7 to repeatedly execute processing described above.

When the post-shift enlarged display area reaches the lower end of the current read area as shown in FIGS. 8I and 8J, the read area is switched. In this case, pixel data are obtained through a culled read of the image data over the whole image plane range 150 at the image sensor 2, as shown in FIG. 8K and the image data thus obtained through the culled read are displayed as a through image at the monitor 17, as shown in FIG. 8L in step 11. In the following step 12, the black frame 100 indicating the center of the post-shift enlarged display area 120 is superimposed over the through image displayed at the monitor 17 so as to enable the photographer to locate the enlarged display area in the overall image plane.

Next, the read area is switched in step 13. In this example, the read area is switched to the central area 250 in the photographic image plane as shown in FIG. 8N. Subsequently, the operation returns to step 6 to read out the pixel data at all the pixels present in the new read area 250 at the image sensor 2 and then bring up enlarged display at the monitor 17 by using the pixel data in the post-shift enlarged display area 120 sliced out from the pixel data from all the pixels present in the read area 250 (see FIG. 8M).

It is to be noted that if it is decided in step 2 that an enlarged display area position setting operation has not been performed, if it is decided in step 5 that an enlarge operation to bring up an enlarged display has not been performed or it is decided in step 7 that an enlarged display end operation has been performed, the operation proceeds to step 14 to check whether or not the shutter release button at the operation member 18 has been operated. If it is decided that a shutter release button operation has not been performed, the operation returns to step 2 to repeatedly execute the processing described above. If, on the other hand, it is decided that the shutter release button has been operated, the operation proceeds to step 15 to end the through image display of the captured image at the monitor 17. Then, an image-capturing operation is executed at the image sensor 2 in step 16. The captured image is readout from the image sensor 2, the captured image thus read out undergoes image processing of the known art and the resulting image data are recorded into a recording medium (not shown) such as a memory card in the following step 17.

While it is desirable that the pixel data read area set within the full image plane range at the image sensor 2, from which pixel data are to be read out, range over as large an area as possible, it is also necessary to ensure that the pixel data read area is set within a range that allows the image read speed (frame rate) at which the image is read out from the image sensor 2 for the through image display to be sustained at a certain level. For instance, if the through image display is to be brought up at 30 FPS, i.e., the read speed at which 30 frames are read out per second, the read area must be set over a range that contains image data, the volume of which allows all the pixel data in the read area to be read out at the rate of 30 FPS. By setting the read area as described above, the enlarged display can be provided while sustaining the through image display frame rate and ultimately, a moving subject can be displayed in an enlargement in real time. It is to be noted that FIG. 8O shows the read area (lower area) 300 selected as the focus detection area 100 is shifted further downward on the monitor 17. As the comparison with FIG. 8N clearly indicates, the lower area 300 partially overlaps the central area 250.

In the second embodiment described above, the pixel data at all the pixels present within the read area set inside the plane of the full image captured via the image sensor 2 are read out and then the pixel data over the enlarged display area are sliced out for display at the monitor 17. As a result, a portion of the image captured via the image sensor 2 is brought up on display at the monitor 17 as an enlarged display image with the resolution matching the resolution with which the image is captured via the image sensor 2. Namely, the enlarged the image is displayed with the resolution matching that of the captured image.

As explained above, as the position for the enlarged display (enlarged display position) is selected via the area shift switch at the operation member 18 on the through image on display at the monitor 17, the read area corresponding to the enlarged display position is set on the photographic image plane at the image sensor 2, the image data in the read area are read out from the image sensor 2 and the image constituted with the image data at the enlarged display position, sliced out from the image data in the read area, is displayed at the monitor 17 in the second embodiment. As a result, the image at any position within the photographic image plane can be displayed in an enlargement in real time in synchronization with the movement of the subject, at a resolution matching that of the captured image.

In addition, as the enlarged display position is shifted via the operation member 18, a decision is made as to whether or not to switch the read area and if it is decided that the read area should be switched, the captured image from the image sensor 2 is first brought up on display at the monitor 17 as a through image with the post-shift enlarged display position superimposed thereupon in the second embodiment. Then, the image data from the new read area are read out from the image sensor 2, the image data at the post-shift enlarged display position are sliced out from the image data from the read area and the image constituted with the image data thus sliced out is displayed at the monitor 17. The photographer is thus able to easily ascertain the specific position to which the enlarged display position has been shifted in the photographic image plane.

In the second embodiment, if it is decided that the read area does not need to be switched, the image data at the post-shift enlarged display position are sliced out from the image data in the current read area and the image constituted with the sliced-out image data is brought up on display at the monitor 17. In other words, since the read area does not need to be switched each time the enlarged display position is shifted, the enlarged display processing is simplified.

In the second embodiment, the enlarged display position is selected via the area shift switch at the operation member 18 which is used to set the detection position for detecting the focal adjustment state of the photographic lens 23 within the photographic image plane of the image sensor 2. This allows the photographer trying to focus the photographic lens 23 on a specific main subject to verify the state of the main subject image by checking the monitor 17 and, as a result, a photograph with the main subject in focus can be obtained.

Another Embodiment

It is to be noted that while all the pixel data are read out (step 6) regardless of the enlargement magnification factor selected for the enlarged display in response to an enlarge operation (step 5) performed to bring up an enlarged display through digital zoom in the enlarged display processing (see FIG. 7) executed in the second embodiment described above, the present invention is not limited to this example.

Figure 9:
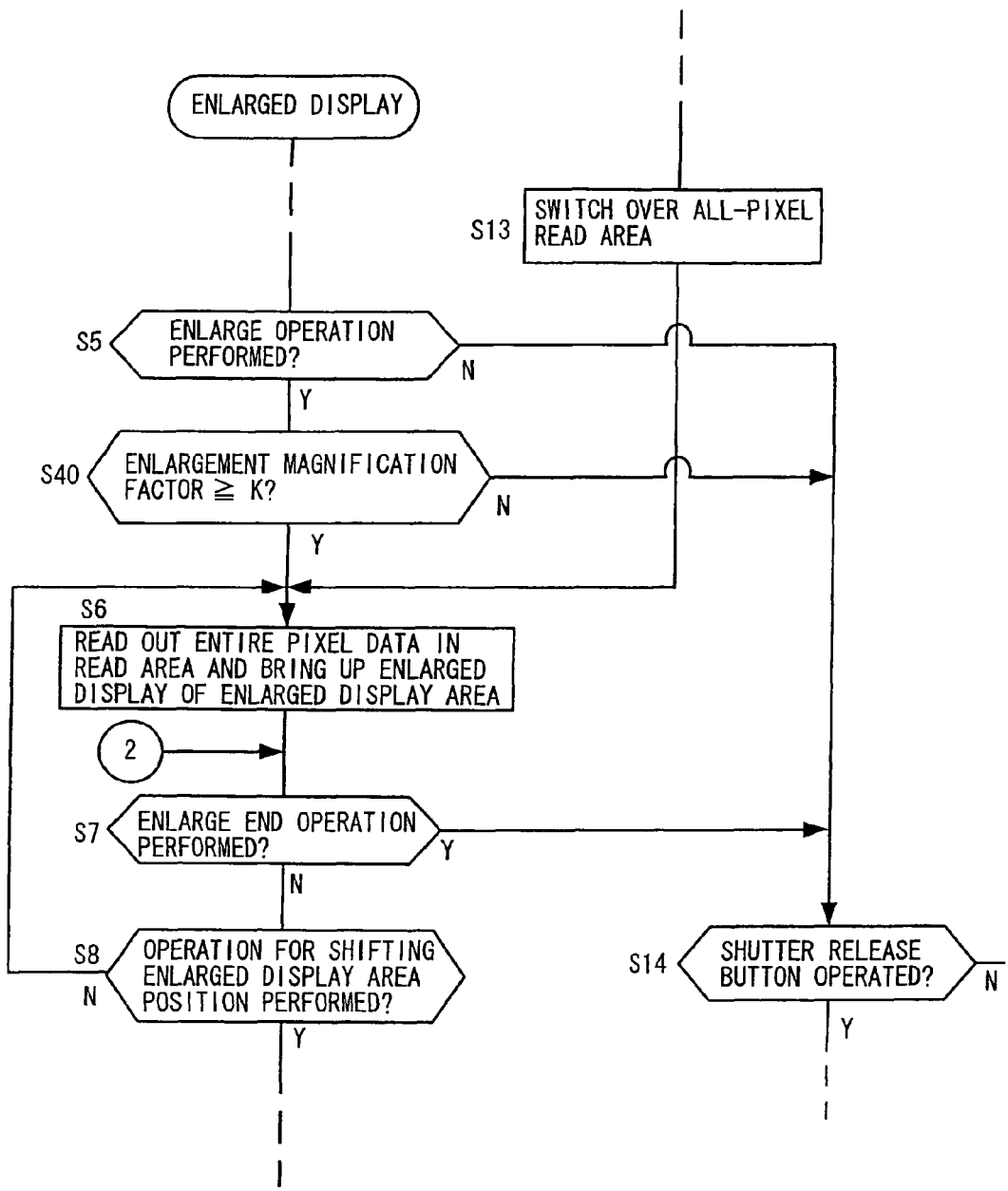
FIG. 9 presents a flowchart of the enlarged display processing executed in another embodiment.

The following is an explanation of the display processing operation executed in another embodiment by taking into consideration the enlargement factor. It is to be noted that the same step numbers are assigned to steps in which an operation similar to that in the enlarged display processing in the second embodiment shown in FIG. 7 is executed and a repeated explanation is not provided. FIG. 9 presents a flowchart of the enlarged display processing executed in the other embodiment. This enlarged display processing differs from that in the second embodiment in that either an all-pixel read or a culled read is executed based upon the enlargement factor.

After executing the processing in steps 1 through 5 in FIG. 7, the operation proceeds to step 40 in FIG. 9 to make a decision as to whether or not the enlarge operation instruction indicates an enlarged display at a magnification factor equal to or greater than a predetermined magnification factor (multiplied by K). At the predetermined magnification factor (K), the image displayed in an enlargement at the LCD monitor 17 by using pixel data (the through image) obtained through the culled read is deemed too coarse for viewing. In other words, as long as the enlargement magnification factor is less than K, the image (through image) obtained through the culled read and displayed in an enlargement at the LCD monitor 17 will sustain a good enough image quality for viewing. It is to be noted that information indicating the predetermined magnification factor (K) is stored in advance in the memory in the control circuit 7 of the camera.

If an affirmative decision is made (if the enlargement magnification factor is determined to be equal to or greater than K) in step 40, the operation proceeds to step 6, whereas if a negative decision is made (i.e., if the enlargement magnification factor is determined to be less than K), the operation proceeds to step 14. The subsequent processing is executed as has been described in reference to FIG. 7.

Variation of the Other Embodiment

While only two display modes, i.e., the culled read display for reducing pixels (through image display) and the all-pixel read display, are assumed in each embodiment described above, the display modes may further include a fine through image display mode in which the pixel data are read out from pixels, the number of which is set between that for the through image read and that corresponding to the all-pixel read. Namely, in the fine through image display mode, the pixel data are read out at a reducing rate different from the reducing rate for the through image display (at a reducing rate lower than the reducing rate for the through image display). The "lower reducing rate" in this context means that the number of pixels to be reduced, in other words, to be discarded is smaller. Namely, when the reducing rate is lower, the ratio of the number of pixels constituting the image generated through the culling processing to the number of pixels constituting the original image is greater.

The structure allows an optimal read/display mode to be selected in the camera in correspondence to the enlargement factor indicated in the enlarge instruction. Consequently, an advantage is achieved in that the length of time required for the pixel read can be reduced without compromising the quality of the display image (while assuring an image quality high enough for viewing) at any enlargement magnification factor.

Figure 10:
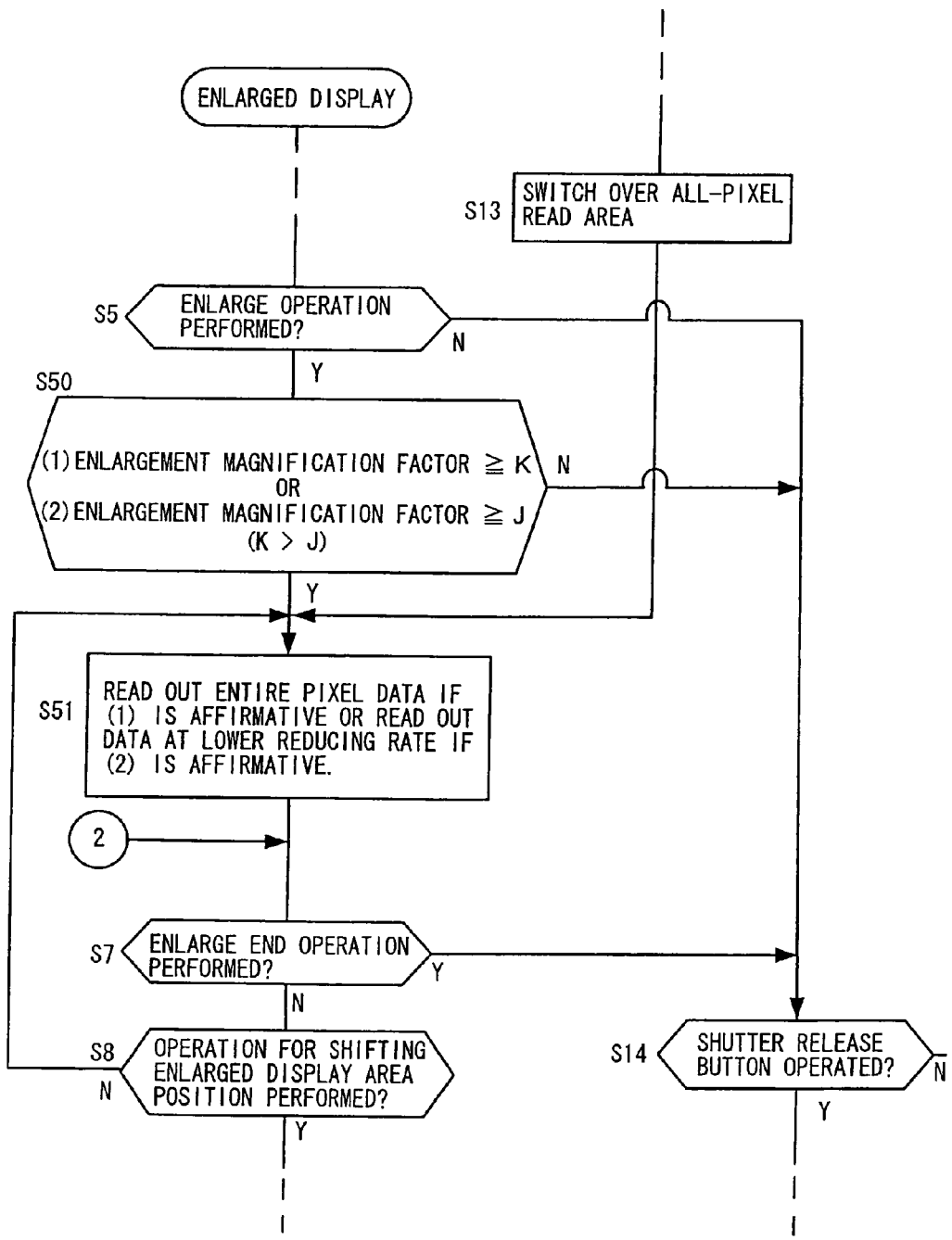
FIG. 10 presents a flowchart of the processing executed in a variation of the other embodiment.

FIG. 10 presents a flowchart of the enlarged display processing executed in conjunction with the additional display mode, i.e., the fine through image display mode. It is to be noted that the same step numbers are assigned to steps in which an operation identical to that in FIG. 7, in reference to which the second embodiment has been described is executed, and a repeated explanation is omitted. After executing the processing in steps 1 through 5 in FIG. 7, a decision is made in step 50 as to whether or not (1) the enlarge operation instruction indicates an enlarged display at a magnification factor equal to or greater than a first predetermined magnification factor (K) or (2) the enlarge operation instruction indicates an enlarged display at a magnification factor less than the first predetermined magnification factor but equal to or greater than a second predetermined magnification factor (J) (J<K). If an affirmative decision is made with regard to (1) or (2), the operation proceeds to step 51, whereas if a negative decision is made with regard to (1) and (2), (i.e., the specified enlargement magnification factor is less than J), the operation proceeds to step 14.

In step 51, processing similar to that executed in step 6 in FIG. 7 is executed, provided that an affirmative decision has been made in step 50 with regard to (1). If, on the other hand, an affirmative decision has been made in step 50 with regard to (2), an enlarged display is brought up at the LCD 17 in the fine through image display mode explained above.

It is to be noted that an image displayed in an enlargement at the LCD monitor 17 at a magnification factor equal to or greater than the first predetermined magnification factor (K) will be too coarse for satisfactory viewing, either in the through image display mode or in the fine through image display mode in this variation. In addition, an image displayed on the LCD monitor 17 in an enlargement at a magnification factor equal to or greater than the second predetermined magnification factor (J) will be too coarse to assure satisfactory viewing in the through image display mode. Information indicating these predetermined magnification factors (K and J) is stored in advance in the memory in the control circuit 7 of the camera.

Subsequently, the operation proceeds to step 7 to execute processing similar to that shown in FIG. 7.

It is to be noted that while only one extra read mode corresponding to an intermediate number of pixels is added in the variation described above, a plurality of read modes may be set in correspondence to different numbers of pixels at which the image data are read out, so as to display an enlarged image by reading out pixel data in one of the read modes in correspondence to a specific enlargement magnification factor set for the enlarged display.

In addition, instead of allowing the user to select an enlargement magnification factor, the camera may adopt a structure that ensures that only an enlargement magnification factor facilitating the enlarged display processing (reducing control for the pixel read) by the camera is selected in response to an enlarged display instruction (imposes restrictions on the enlargement magnification factor that can be set).

The above described embodiments are examples and various modifications can be made without departing from the scope of invention.

What is claimed is:

1. An image-capturing device, comprising:
    an image-capturing unit that captures a subject image formed via a photographic optical system;
    a display unit that displays a through image of the subject image captured by the image-capturing unit;
    an enlargement area setting unit that sets a position of an enlargement area in the through image of the subject image to be displayed in an enlargement at the display unit;
    a display control unit that enlarges the subject image corresponding to the enlargement area set by the enlargement area setting unit and brings up the enlarged subject image on display at the display unit; and
    a decision-making unit that makes a decision as to whether or not an absent portion in which the subject image is not present will appear in a display screen of the display unit if the subject image corresponding to the enlargement area having been set is displayed in an enlargement at the display screen of the display unit, wherein
    in response to a change instruction for changing the position of the enlargement area issued by the enlargement area setting unit while the enlarged subject image is on display, the display control unit shifts the enlargement area by sustaining a state of enlarged display of the subject image and displays the subject image corresponding to the shifted enlargement area at the display unit, and
    if the decision-making unit determines that the absent portion will appear, the enlargement area setting unit alters the enlargement area so as to ensure that the absent portion will not appear in the display screen.

2. An image-capturing device according to claim 1, further comprising:
    a detection area setting unit that sets a detection area from which a specific type of subject information is detected from a photographic field, wherein:
    the enlargement area setting unit sets an area containing the detection area as the enlargement area.

3. An image-capturing device according to claim 2, wherein:
    in a display mode in which the display control unit allows the detection area to be displayed at any position within the display screen at the display unit, the enlargement area setting unit alters the enlargement area.

4. An image-capturing device according to claim 3, wherein:
    in response to a change instruction for changing the position of the enlargement area issued via the enlargement area setting unit while the enlarged subject image is on display, the decision-making unit makes a further decision as to whether or not the absent portion will appear if the position of the enlargement area is altered as indicated in the change instruction; and
    if the decision-making unit determines that the absent portion will appear, the display control unit adjusts the position of the detection area in the display screen and brings up a display without changing the position of the enlargement area, as indicated in the change instruction.

5. An image-capturing device, comprising:
    an image-capturing unit including a plurality of image-capturing pixels, that captures an image formed via a photographic optical system;
    a display unit that displays the image captured by the image-capturing unit;
    an operation member enabling a setting operation to be performed on the image captured by the image-capturing unit on display in order to set an enlargement area position of an enlargement area for an enlarged display;
    an area setting unit that sets a read area, which is a partial area within the image-capturing pixels, based upon the enlargement area position having been set; and
    a control unit that reads out image data in the read area set by the area setting unit and brings up on a display at the display unit an enlarged image based upon image data obtained by slicing out some of the image data in the read area having been read out in correspondence to the enlargement area position in response to an enlarged display execution construction, wherein
    there are provided a first display mode in which an image is displayed based upon image data read out from all pixels present in the partial area within the image-capturing Pixels and a second display mode in which an image is displayed based upon image data read out from some pixels culled from the image-capturing pixels, the display unit displays the image captured by the image-capturing unit in the first display mode or in the second display mode, the operation member allows the enlargement area position for the enlarged display to be set freely on the image second display mode, the area setting unit sets the read area within the image-capturing pixels to be read out from in the first display mode based upon the enlargement area position, the control unit brings up the enlarged image on display at the display unit in the first display mode, and each time the enlargement area position is shifted via the operation member, the area setting unit makes a decision as to whether or not a switchover of the read area is required and switches the read area to a new read area corresponding to the shifted enlargement area position if the switchover is determined to be necessary.

6. An image-capturing device according to claim 5, wherein:

if the switchover of the read area is determined to be necessary by the area setting unit, the control unit controls the display unit so as to switch from the first display mode to the second display mode, indicate a post-shift enlarged display position by superimposing the post-shift enlarged display position upon the image captured via the image-capturing unit prior to the enlarged display, switch back to the first display mode and bring up an enlarged display of an image based upon image data sliced out from image data in the new read area in correspondence to the shifted enlargement area position.

7. An image-capturing device according to claim 5, wherein:

if the switchover of the read area is determined to be unnecessary by the area setting unit, the control unit brings up on display at the display unit an image corresponding to image data sliced out from the image data in the read area in correspondence to the shifted enlargement area position.

8. An image-capturing device, comprising:

an image-capturing unit including a plurality of image-capturing pixels, that captures an image formed via a photographic optical system;

a display unit that displays the image captured by the image-capturing unit;

an operation member enabling a setting operation to be performed on the image captured by the image-capturing unit on display in order to set an enlargement area position of an enlargement area for an enlarged display;

an area setting unit that sets a read area, which is a partial area within the image-capturing pixels, based upon the enlargement area position having been set; and a control unit that reads out image data in the read area set by the area setting unit and brings up on display at the display unit an enlarged image based upon image data obtained by slicing out some of the image data in the read area having been read out in correspondence to the enlargement area position in response to an enlarged display execution construction, wherein there are provided a first display mode in which an image is displayed based upon image data read out from all pixels present in the partial area within the image-capturing pixels and a second display mode in which an image is displayed based upon image data read out from some pixels culled from the image-capturing pixels, the display unit displays the image captured by the image-capturing unit in the first display mode or in the second display mode, the operation member allows the enlargement area position for the enlarged display to be set freely on the image captured by the image-capturing unit on display in the second display mode, the area setting unit sets the read area within the image-capturing pixels to be read out from in the first display mode based upon the enlargement area position, the control unit brings up the enlarged image on display at the display unit in the first display mode, and the area setting unit sets the read area containing image data with a data volume thereof allowing a specific image data read speed to be sustained in the second display mode.

9. An image-capturing device, comprising:

an image-capturing unit including a plurality of image-capturing pixels, that captures an image formed via a photographic optical system;

a display unit that displays the image captured by the image-capturing unit;

an operation member enabling a setting operation to be performed on the image captured by the image-capturing unit on display in order to set an enlargement area position of an enlargement area for an enlarged display;

an area setting unit that sets a read area, which is a partial area within the image-capturing pixels, based upon the enlargement area position having been set; and a control unit that reads out image data in the read area set by the area setting unit and brings up on display at the display unit an enlarged image based upon image data obtained by slicing out some of the image data in the read area having been read out in correspondence to the enlargement area position in response to an enlarged display execution construction, wherein there are provided a first display mode in which an image is displayed based upon image data read out from all pixels present in the partial area within the image-capturing pixels and a second display mode in which an image is displayed based upon image data read out from some pixels culled from the image-capturing pixels, the display unit displays the image captured by the image-capturing unit in the first display mode or in the second display mode, the operation member allows the enlargement area position for the enlarged display to be set freely on the image captured by the image-capturing unit on display in the second display mode, the area setting unit sets the read area within the image-capturing pixels to be read out from in the first display mode based upon the enlargement area position, the control unit brings up the enlarged image on display at the display unit in the first display mode, and the area setting unit sets a plurality of read areas so as to allow the read areas to overlap one another.

10. An image-capturing device, comprising:

an image-capturing unit including a plurality of image-capturing pixels, that captures an image formed via a photographic optical system;

a display unit that displays the image captured by the image-capturing unit;

an operation member enabling a setting operation to be performed on the image captured by the image-capturing unit on display in order to set an enlargement area position of an enlargement area for an enlarged display;

an area setting unit that sets a read area, which is a partial area within the image-capturing pixels, based upon the enlargement area position having been set; and a control unit that reads out image data in the read area set by the area setting unit and brings up on display at the display unit an enlarged image based upon image data obtained by slicing out some of the image data in the read area having been read out in correspondence to the enlargement area position in response to an enlarged display execution construction, wherein there are provided a first display mode in which an image is displayed based upon image data read out from all pixels present in the partial area within the image-capturing pixels and a second display mode in which an image is displayed based upon image data read out from some pixels culled from the image-capturing pixels, the display unit displays the image captured by the image-capturing unit in the first display mode or in the second display mode, the operation member allows the enlargement area position for the enlarged display to be set freely on the image captured by the image-capturing unit on display in the second display mode, the area setting unit sets the read area within the image-capturing pixels to be read out from in the first display mode based upon the enlargement area position, the control unit brings up the enlarged image on display at the display unit in the first display mode, and the control unit brings up a display in the first display mode only when an enlarged display execution instruction indicates execution of an enlarged display at a magnification factor equal to or greater than a predetermined magnification factor.

11. An image-capturing device, comprising:

an image-capturing unit including a plurality of image-capturing pixels, that captures an image formed via a photographic optical system;

a display unit that displays the image captured by the image-capturing unit;

an operation member enabling a setting operation to be performed on the image captured by the image-capturing unit on display in order to set an enlargement area position of an enlargement area for an enlarged display;

an area setting unit that sets a read area, which is a partial area within the image-capturing pixels, based upon the enlargement area position having been set; and a control unit that reads out image data in the read area set by the area setting unit and brings up on display at the display unit an enlarged image based upon image data obtained by slicing out some of the image data in the read area having been read out in correspondence to the enlargement area position in response to an enlarged display execution construction, wherein there are provided a first display mode in which an image is displayed based upon image data read out from some pixels culled from pixels present in the partial area within the image-capturing pixels at a first reducing rate and a second display mode in which an image is displayed based upon image data read out from some pixels culled from the image-capturing pixels at a second reducing rate, the display unit displays the image captured by the image-capturing unit in the first display mode or in the second display mode, the operation member allows the enlargement area position for the enlarged display to be set freely on the image captured by the image-capturing unit on display in the second display mode, the area setting unit sets the read area within the image-capturing pixels to be read out from in the first display mode based upon the enlargement area position, and the control unit brings up the enlarged image on display at the display unit in the first display mode.

* * * * *